US00RE40037E

(19) United States
(12) Reissued Patent
Hasegawa et al.

(10) Patent Number: US RE40,037 E
(45) Date of Reissued Patent: Jan. 29, 2008

(54) ELECTRIC POWER SYSTEM PROTECTION AND CONTROL SYSTEM

(75) Inventors: Osamu Hasegawa, Tokyo (JP); Yoshihiro Shirota, Tokyo (JP); Yasuo Kaino, Tokyo (JP)

(73) Assignee: Kabushiki Kaisha Toshiba, Kawasaki (JP)

(21) Appl. No.: 10/322,588

(22) Filed: Dec. 19, 2002

Related U.S. Patent Documents

Reissue of:
(64) Patent No.: 6,198,402
Issued: Mar. 6, 2001
Appl. No.: 09/292,683
Filed: Apr. 16, 1999

(30) Foreign Application Priority Data

Apr. 17, 1998 (JP) ..... 10-108255

(51) Int. Cl.
*G08B 21/00* (2006.01)
*H02H 3/00* (2006.01)
*H02H 7/26* (2006.01)

(52) U.S. Cl. ..... 340/635; 340/286.01; 340/286.02
(58) Field of Classification Search ..... 340/635, 340/286.01, 286.02; 705/FOR. 103
See application file for complete search history.

(56) References Cited

U.S. PATENT DOCUMENTS 5,926,089 A 7/1999 Sekiguchi et al. ..... 340/500

FOREIGN PATENT DOCUMENTS

| | | |
|---|---|---|
| EP | 0 853 368 | 7/1998 |
| EP | 0 940 901 | 8/1999 |
| JP | 10-222785 | 8/1998 |
| JP | 10-257661 | 9/1998 |

OTHER PUBLICATIONS

Toshiba Fuchu Works, Project I, pp. 2–35, 1991.
Toshiba Protective Relays, Toshiba Corporation, pp. 1–13.
Bolam et al., "Experience in the Application of Substation Co–Ordinated Control and Protection with Development Trends In the Standard Control System Open Architecture," *Fourth International Conference on Power System Control and Management*, pp. 92–97, London, UK, Apr. 16–18, 1996.

(Continued)

*Primary Examiner*—Julie Bichngoc Lieu
(74) *Attorney, Agent, or Firm*—Foley & Lardner LLP

(57) ABSTRACT

A Power system protection and control system has protection and control terminals that perform protection and control of a power system by operation of a plurality of CBs in response to state variables input from power system; and a power system monitoring and control host mutually connected in a fashion to permit data exchange through a transmission system (communication network) with protection and control terminals and that performs monitoring and control of power system in accordance with data transmitted from protection and control terminals. Protection and control terminals each has a correlation circuit that performs correlation of an operated CB and the cause of its operation, using information sent from protective relay circuit, CB control circuit, re-closure circuit and CB state receiving circuit when at least one of a plurality of CBs is operated, and a correlation result transmission circuit that transmits the result obtained by the correlation processing of this correlation circuit to power system monitoring and control host through transmission system. The power system monitoring and control host includes a correlation result transmission unit that receives and displays the correlation result transmitted through transmission system from correlation result transmission circuit, associated message file storage unit and CB operation display unit.

18 Claims, 16 Drawing Sheets

OTHER PUBLICATIONS

Lu Wenzhe et al., "A Simple Data Communication Scheme of a Modular Comprehensive Automation System for Substations," *Proceedings on the 4th International Conference on Advances in Power System Control, Operation and Management*, pp. 317–320, Hong Kong, Nov. 11–14, 1997.

Ungrad et al., "The Role of SMS (Substation Monitoring Systems) in Enhancing Protection and Control Functions," *12th International Conference on Electricity Distribution*, pp. 4.10.1–4.10.5, London, UK, May 17–21, 1993.

*FIG.6*

| | d1 | d2 | d3 | d4 | d5 | d6 |
|---|---|---|---|---|---|---|
| MD1 | SUBSTATION A | XY TRANSMISSION LINE 2L CB | 10:10:10 | TRIP | FAULT STATE CHANGE | MAIN PROTECTION (GROUND FAULT) BACKUP GROUND FAULT |
| MD2 | SUBSTATION A | XY TRANSMISSION LINE 2L CB | 10:10:11 | CLOSE | RE-CLOSURE SUCCEEDED | |
| MD3 | SUBSTATION B | XY TRANSMISSION LINE 1L CB | 10:10:01 | CLOSE | MANUAL STATE CHANGE | |

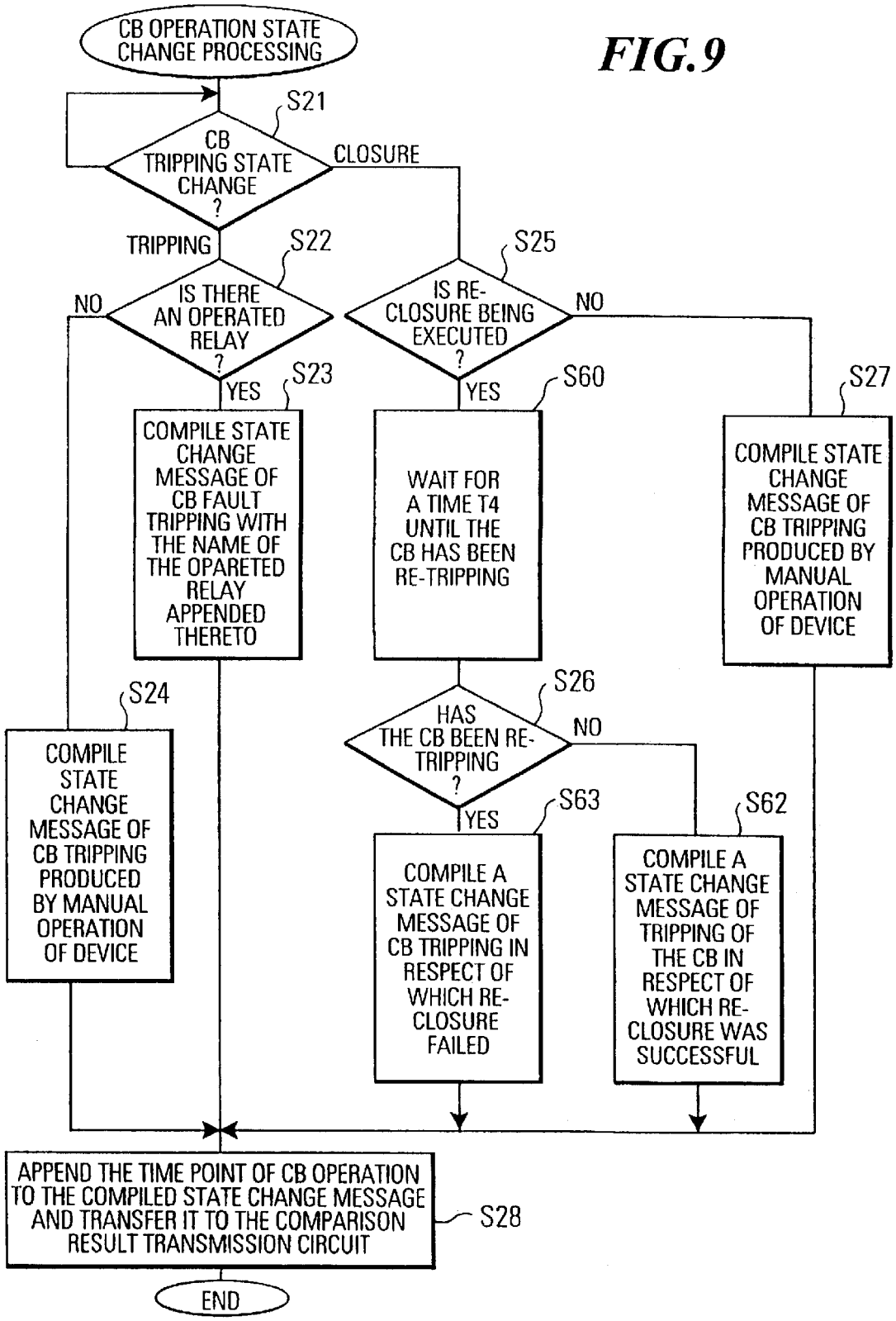
FIG.9
CB OPERATION STATE CHANGE PROCESSING
S21
CB TRIPPING STATE CHANGE ?
CLOSURE
TRIPPING
S22
IS THERE AN OPERATED RELAY ?
NO
YES
S23
COMPILE STATE CHANGE MESSAGE OF CB FAULT TRIPPING WITH THE NAME OF THE OPARETED RELAY APPENDED THERETO
S24
COMPILE STATE CHANGE MESSAGE OF CB TRIPPING PRODUCED BY MANUAL OPERATION OF DEVICE
S25
IS RE-CLOSURE BEING EXECUTED ?
NO
YES
S60
WAIT FOR A TIME T4 UNTIL THE CB HAS BEEN RE-TRIPPING
S27
COMPILE STATE CHANGE MESSAGE OF CB TRIPPING PRODUCED BY MANUAL OPERATION OF DEVICE
S26
HAS THE CB BEEN RE-TRIPPING ?
NO
YES
S63
COMPILE A STATE CHANGE MESSAGE OF CB TRIPPING IN RESPECT OF WHICH RE-CLOSURE FAILED
S62
COMPILE A STATE CHANGE MESSAGE OF TRIPPING OF THE CB IN RESPECT OF WHICH RE-CLOSURE WAS SUCCESSFUL
APPEND THE TIME POINT OF CB OPERATION TO THE COMPILED STATE CHANGE MESSAGE AND TRANSFER IT TO THE COMPARISON RESULT TRANSMISSION CIRCUIT
S28
END

FIG. 13

| | | | | | |
|---|---|---|---|---|---|
| D1 | JANUARY 19th 22: 01: 15 | SUBSTATION C | XX TRANSMISSION LINE 1L | MAIN PROTECTION (GROUND FAULT) | OPERATE |
| D2 | JANUARY 19th 22: 01: 15 | SUBSTATION C | XX TRANSMISSION LINE 1L | CB | TRIP |
| Dx1 | JANUARY 19th 22: 01: 15 | SUBSTATION B | FF TRANSMISSION LINE 1L | MAIN PROTECTION (GROUND FAULT) | OPERATE |
| Dx2 | JANUARY 19th 22: 01: 15 | SUBSTATION Z | YY TRANSMISSION LINE 2L | CB | OPERATE |
| Dx3 | JANUARY 19th 22: 01: 15 | SUBSTATION A | FF TRANSMISSION LINE 1L | CB | TRIP |
| Dx4 | JANUARY 19th 22: 01: 16 | SUBSTATION A | FF TRANSMISSION LINE 1L | MAIN PROTECTION (GROUND FAULT) | OPERATE |
| Dx5 | JANUARY 19th 22: 01: 16 | SUBSTATION B | FF TRANSMISSION LINE 1L | CB | TRIP |

*FIG.14*

| | | | | | | | |
|---|---|---|---|---|---|---|---|
| M | JANUARY 19th 22: 01: 15 | SUBSTATION C | XX TRANSMISSION LINE 1L | CB | FAULT TRIP | MAIN PROTECTION (GROUND FAULT) | OPERATE |
| M1 | JANUARY 19th 22: 01: 15 | SUBSTATION Z | YY TRANSMISSION LINE 2L | CB | FAULT TRIP | MANUAL OPERATE | |
| M2 | JANUARY 19th 22: 01: 15 | SUBSTATION A | FF TRANSMISSION LINE 1L | CB | FAULT TRIP | MAIN PROTECTION (GROUND FAULT) | OPERATE |
| M3 | JANUARY 19th 22: 01: 15 | SUBSTATION B | FF TRANSMISSION LINE 1L | CB | FAULT TRIP | MAIN PROTECTION (GROUND FAULT) | OPERATE |

FIG.15

| CB: SUBJECT OF CORRELATION | ASSOCIATION WITH DIRECTION OF TRIPPING | ASSOCIATION WITH DIRECTION OF CLOSURE |
|---|---|---|
| ⋮ | ⋮ | ⋮ |
| SUBSTATION C: XX TRANSMISSION LINE 1L CB | 1) SUBSTATION C: XX TRANSMISSION LINE 1L MAIN PROTECTION (GROUND FAULT)<br>2) SUBSTATION C: XX TRANSMISSION LINE 1L BACKUP PROTECTION<br>3) SUBSTATION C: BUS PROTECTION | SUBSTATION C: XX TRANSMISSION LINE 1L RE-CLOSE |
| SUBSTATION C: XX TRANSMISSION LINE 2L CB | 1) SUBSTATION C: XX TRANSMISSION LINE 2L MAIN PROTECTION (GROUND FAULT)<br>2) SUBSTATION C: XX TRANSMISSION LINE 2L BACKUP PROTECTION<br>3) SUBSTATION C: BUS PROTECTION | NO ASSOCIATION |
| ⋮ | ⋮ | ⋮ |

ELECTRIC POWER SYSTEM PROTECTION AND CONTROL SYSTEM

Matter enclosed in heavy brackets [ ] appears in the original patent but forms no part of this reissue specification; matter printed in italics indicates the additions made by reissue.

FIELD OF THE INVENTION

The invention relates to a power system protection and control terminal for protection and control of a power system by operating switches such as circuit breakers in response to state variables input from the power system, a power system monitoring and control system, and a storage medium in which a program is stored.

In particular, the storage medium relates to a power system protection and control terminal equipped with a function for performing correlation processing of a protective relay and, a switch operation, a power system monitoring control system and a storage medium for storing a program.

DESCRIPTION OF THE RELATED ART

A power system monitoring and control system has a plurality of protection and control terminals arranged, for example, corresponding to each substation constituting the power system and that perform protection and control of the power system in accordance with state variables such as currents or voltages obtained from the power system, and a power system monitoring and control host that performs monitoring and/or control of this power system by receiving information of various types relating to the power system sent from these plurality of protection and control terminals through a transmission system (power system information: for example, open/closed state of circuit breakers, bus voltages, power flow of transmission lines and their frequency etc.) and displays the power system information which it receives.

FIG. 11 shows an example of a circuit block layout of a prior art power system monitoring and control system 10.

A power system monitoring and control system 10 comprises a plurality of protection and control terminals 12-1–12-n that perform protection and control of a power system 11, and a power system monitoring and control host 14 that monitors and controls the power system 11 using power system information of various types (for example, the open/closed state of circuit breakers etc.) that it receives which is transmitted through a transmission system 13 from these plurality of protection and control terminals 12-1–12-n. It should be noted that although FIG. 11 shows only the circuit block layout of a single protection and control terminal 12-1, the block layout of the other protection and control terminals 12-2 . . . 12-n are omitted from the drawing, as their circuit block layouts are identical with that of protection and control terminal 12-1.

As shown in FIG. 11, protection and control terminal 12-1 consists of a protective relay circuit 21, a CB control circuit 22, a re-closure circuit 23, a CB state-receiving circuit 24, and a system state transmission circuit 25.

The protective relay circuit 21 has one or more (for example three) relay elements (these could be simply relays or relay unit software, for example, a main protective ground relay, a main protective short-circuit relay and a backup short-circuit relay), that detects system fault of the power system 11 by operation of the relay elements in response to state variables input from the power system 11.

The CB control circuit 22 outputs tripping/closure instructions to a switch such as a circuit breaker {hereinafter called circuit breaker (CB) 11a} located on a transmission line or bus etc. for tripping a system circuit constituting the power system 11 in response to operation of these protective relay circuits 21 (the relay element 21a1–21a3, which is not described in figure.).

The re-closure circuit 23 performs re-closure processing of the CB 11a by means of the CB control circuit 22 as required in response to operation of the protective relay circuit 21.

The CB state-receiving circuit 24 gets the open/closed state of the CB 11a.

The system state transmission circuit 25 sends it to the power system monitoring and control host 14 through the transmission system 13 power system information including the operating state of the relay elements 21a1–21a3 of the protective relay circuit 21, the operating state of the reclosure circuit 23 and the open/closed state of the CB 11a that is obtained by the CB state receiving circuit 24.

In FIG. 11, the protection and control terminal 12-1 is shown as effecting tripping/closure operation of the single CB 11a using a plurality of relay elements 21a1–21a3.

But, in fact, tripping/closure operation is performed for a respective plurality (for example two) of the CB 11a, 11b, using a plurality of relay elements 21a1–21a3.

For example, respective tripping/closure operation is performed of the relay element 21a1→CB 11a, relay elements 21a2, 21a3→CB 11b.

The power system monitoring and control host 14 has a state change detection unit 41, a state change data file storage unit 42, a CB relay correlation unit 43, an associated state change message file storage unit 44 and a CB operation display unit 45.

The state change detection unit 41 receives power system information sent from the plurality of the protection and control terminals 12-1–12-n through the transmission system 13, and detects when there is a change in the state of the power system 11 from this received power system information (hereinafter abbreviated to "state change").

The state change detection unit 41 sends to a CB relay correlation unit, to be described, later state change data which it compiles from the detected state changes, appending thereto the time-point of detection; and the state change data file storage unit 42 that stores in file form the state change data compiled by the state change detection unit 41.

The CB relay correlation unit 43 compiles a message (also called associated state change message or state change message) associating the CB operation state changes (also called CB state changes) and relay operation state changes (also called relay state changes) by effecting correlation of the CB operating state changes and relay operating state changes, using for this purpose the state change data that was transmitted.

The associated state change message file storage unit 44 stores in the form of file the associated state change message compiled by the CB relay correlation unit 43.

The CB operation display unit 45 provided with a display device such as a display (hereinafter termed a display) and reads the associated state change message (file) stored in the associated state change message file storage unit and displays this on the display screen.

FIG. 12 shows an example of the transmission format of the power system information that is received by a power system monitoring and control host 14 through the transmission system 13.

As shown in FIG. 12, the power system information that is sent at fixed intervals from the protection and control terminals 12-1–12-n is transmitted to the power system monitoring and control host 14 as state data S comprising bit information sequences BD1, BD2, . . . located at each substation (substation A, substation B and substation C, . . . ) constituting the power system 11, in accordance with the transmission format, by transmission system 13.

The bit information sequences BD1, BD2, . . . of the substations constituting state data S include;

1) a one-bit information representing the operating state of the protective relay circuit 21 of which the subject of protective relay action is an equipment or device within the corresponding substation/the operating state of the re-closure circuit 23 of which the subject of re-closure action is an equipment or a device within the corresponding substation, and
2) a one-bit information representing the open/closed state of the CB provided in this equipment/device.

For example, as shown in FIG. 12, if the single-bit information of the relay element, the subject of whose protective action is the XX transmission line 1L is "0", this means that this relay element is in a reset state; if the single-bit information of the CB that is located on XX transmission line 1L is "038 , this means that the CB is in an open state.

Also, if the single-bit information is equal to "1" of the relay element of which the subject of protective action is the XX transmission line 1L, this means that this relay element is operated. If the single-bit information of the CB located on the XX transmission line 1L is "1", this means that the CB is in a closed state.

For the transmission system 13, a cyclic digital telemeter (CDT) device or the like is employed that performs transmission in accordance with a cyclic transmission format, or a tele-control (TC) device.

The power system information that is sent from the protection and control terminals 12-1–12-n is transmitted at fixed intervals to the power system monitoring and control host 14 after being converted to the state data S in accordance with the transmission format shown in FIG. 12, through the transmission system 13.

Next, the overall operation of the prior art power system monitoring control system will be described.

Irrespective of whether a normal condition, in which no system fault occurs, or if a system fault state has occurred, the open/closed state of the CB 11a, 11b of for example substation C of power system 11 which are the subjects of the operation of the protection and control terminal 12-1 is periodically obtained by the CB state receiving circuit 24 and transmitted to system state transmission circuit 25.

Likewise, the operating state (operated or reset) of the relay elements 21a1–21a3 of the protective relay circuit 21 and the operating state (re-closure being executed or reset) of the re-closure circuit 23 are transmitted to the system state transmission circuit 25.

For example, in the normal condition, the states: all of the CB 11a, 11b→closed, all of the relay elements 21a1–21a3 of the protective relay circuit 21 reset and re-closure circuit 23→reset, are respectively transmitted to the system state transmission circuit 25.

The transmitted CB open/closed state (closed state) and protective relay/re-closure circuit operating state (reset) are transmitted to the transmission system 13 through the system state transmission circuit 25 and converted to state data S having the transmission format shown in FIG. 12, before being sent to the state change detection unit 41 of the power system monitoring and control host 14.

It should be noted that the CB open/closed state and protective relay/re-closure circuit operating state that are transmitted to the transmission system 13 through the system state transmission circuit of the other protection and control terminals 12-1–12-n are likewise sent, as state data S, to a state change detection unit 41 of the power system monitoring and control host 14.

Under these circumstances, when a system fault occurs in the power system 11, causing the state variable that is input from the power system 11 to change, a prescribed relay element 21a1 of the protective relay circuit 21 is operated in response to this change.

The relay operation signal is transmitted to the CB control circuit 22 and the re-closure circuit 23.

Also, the operated state of the relay element 21a1 is sent to the system state transmission circuit 25.

The CB control circuit 22 then outputs a tripping instruction to the CB 11a corresponding to the relay element 21a1 that has been operated in response to the relay operation signal that was transmitted, and, as a result, the CB 11a opens (closed-open).

Meanwhile, the CB state receiving circuit 24 gets the open/closed state of the CBs 11a and 11b.

So the operation state of the CBs 11a, 11b including the operation state (open state) produced in response to the prescribed tripping of the CB 11a, is transmitted through the CB state receiving circuit 24 to the system state transmission circuit 25 and the re-closure circuit 23.

In response to the CB open/closed state (the CB 11b closed, the CB 11a open) and relay operation state (prescribed relay element 21a1 operated, other relay elements 21a2–21a3 reset) that was transmitted, the system state transmission circuit 25 transmits to the state detection unit 41 of the power system monitoring and control host 14, through the transmission system 13, state data wherein the states of the CB 11a and the relay element 21a1 are changed from "closed and reset" to "open and operated".

When the state change detection unit 41 detects based on the transmitted state data that the CB 11a has been tripped and the relay element 21a1 of the protective relay circuit 21 has been operated, it compiles state change data including the time-point when the detection was made, the name of the substation, the name of the equipment/device that was the subject of protection and control (in the case of a relay element), the name of the equipment/device where the CB is located (in the case of a CB), the name of the relay element (in the case of a relay element) or CB and its operation state.

For example, as shown in FIG. 13, state change data D1 including the detection time-point (January 19th 22 hours 01 minutes 15 seconds), the substation name (substation C), the name of the equipment/device which is the subject of protection and control (XX transmission line 1L), relay element name {main protection ground fault (relay)} and operation state (operated) as constituent elements and state change data D2 containing the detection date (January 19th 22 hours 01 minutes 15 seconds), the name of the substation (substation C), the name of the equipment/device where the CB is located (XX transmission line 1L), the CB and operation state (tripped) as constituent elements are respectively compiled.

Referring to FIG. 13, the state change data Dx1–Dx5 of the other substation relay elements/CBs are also shown.

Min FIG. 14 shows an association of both D1 and D2 in FIG. 13. M1 in FIG. 14 shows an association of Dx2 in FIG. 13. M2 in FIG. 14 shows an association of both Dx3 and Dx4 in FIG. 13. M3 in FIG. 14 shows an association of both Dx1 and Dx5 in FIG. 13. The state data D1, D2 compiled by the state change detection unit 41 is transmitted to the CB relay correlation unit 43 and is stored, in file form, in state change data file storage unit 42.

Using the transmitted state data D1, D2, the CB relay correlation unit 43 correlates the CB operation state change with the relay operation state change that caused this.

The relay element (main protective ground fault) 21a1, the subject of which a protection and control is the XX transmission line 11L, is operated, causing the CB 11a located on the XX transmission line 1L to be tripped, so a state message S containing a single message this relay element (main protective ground fault) 21a1 and CB 11a {detection time (January 19th 22 hours, 01 minutes 15 seconds), substation name (substation C), equipment/device name (the XX transmission line 1L), the CB, the operation details of the CB (fault tripping), the relay element name (main protective ground fault) and relay element operation state} is compiled (see FIG. 14).

In FIG. 14, the other state change messages M0–M3 are also shown.

Referring back to FIG. 11, the state change message S compiled with the CB relay correlation unit 43 is stored in an associated state change message file storage unit 44 in the form of a file.

The CB operation display unit 45 then reads the state change message (file) S stored in the associated the state change message file storage unit 44 and either displays this by means of a display as a state change message viewing screen (for example of display format as shown in FIG. 14), or, alternatively, performs a flicker display of a symbol corresponding to the state-changed CB of the associated state change message S on a system diagram displayed beforehand on a display screen, and a superimposed display of a symbol representing the relay operation at a position adjacent to this symbol which is displayed in a flickering manner, etc.

As a result, it is possible to display in association on a display screen the CB whose operation state has changed and the relay operation that caused the state-change operation of the CB whose state has changed.

Therefore, the operating staff of the power system monitoring and control host 14 can easily and accurately grasp the situation regarding a system fault by viewing the display screen.

Also, when only the CB operation state change is displayed without displaying the relay operation on the display screen, the operating staff can immediately recognize when the operating staff of the protection and control terminals 12-1–12-n or power system on-site workers have manually operated the CB.

In particular, since the power system monitoring and control host 14 monitors and controls from a few tens to a few hundreds of electrical stations (substations etc.), in the event of system fault, several tens of state changes may be simultaneously detected.

However, by display processing of the associated state change data as described above, state changes can be displayed together on the same screen as a "state change message viewing screen" independently of system faults.

So power system monitoring and control can be performed efficiently.

In contrast, the re-closure circuit 23 of the protection and control terminal 2 receives the relay operation signal that was sent from the protective relay circuit 21 and the operation state of the CBs 11a, 11b (CB 11a open) that was sent from the CB state receiving circuit 24.

After a predetermined time has elapsed after receiving the "CB 11a open state", the re-closure circuit 23 sends a re-closure execution signal to the CB control circuit 22, causing the state "re-closure being executed" to be sent to the system state transmission circuit 25.

In response to the transmitted re-closure execution signal, the CB control circuit 22 outputs a circuit-closure instruction to the CB 11a and as a result CB 11a closes (open→closed).

Since the CB state receiving circuit 24 obtains the open/closed state of the CBs 11a, 11b, it then sends the operation state of the CBs 11a, 11b, including the operation state (closed state) resulting from the re-closure of prescribed CB 11a, to the system state transmission circuit 25 and the re-closure circuit 23, through the CB state receiving circuit 24.

Based on the CB open/closed state (CBs 11a, 11b closed state) and the operation state of the re-closure circuit 23 (re-closure operated) that have been transmitted, the system state transmission circuit 25 sends the state data in which the states of the CB 11a and the re-closure circuit 23 have been altered from "open and reset" to "closed and executing" through the transmission system 13 to the state change detection unit 41 of the power system monitoring and control host 14.

Using the transmitted state data, the state change detection unit 41 detects the fact that the CB 11a has been closed and that the re-closure circuit 23 is executing re-closure and compiles state change data including the time-point of detection, the name of the substation, or the equipment/device name where the CB is located, the re-closure execution or CB name and its operation state.

The state change data compiled by the state change detection unit 41 is sent to the CB relay correlation unit 43 and stored in the state change data file storage unit 42.

The CB relay correlation unit 43 correlates the CB closure state change with the state of "re-closure being executed" that caused this, using the state change data that was transmitted to it and, in accordance with the result of this correlation, compiles a single state change message similar to state change data message M mentioned above.

The state change message compiled by the CB relay correlation unit 43 is stored in the associated state change message file storage unit 44.

The CB operation display unit 45 then reads the state change message stored in the associated the state change message file storage unit 44 and provides a state change message viewing screen and/or state change CB/re-closure circuit symbol flicker display etc.

On the other hand, when the re-closure circuit 23 receives the state "CB closed" transmitted to it through CB state receiving circuit 24, after the lapse of a fixed time after this reception, the re-closure circuit 23 resets the "re-closure being executed" signal.

As a result, the power system 11 and the protection and control terminal 12-1 assume the normal state "all of the CBs 11a, 11b→closed, all of the relay elements 21a1–21a3 of the protective relay circuit 21→reset, and re-closure circuit 23→reset".

However, in operation processing of the power system monitoring control system 10 as described above, depending on the mode of allocation in the transfer format, when the power system information is converted into state data (referred at as "positioning") and/or the mode of the transmission system 13, there may be a considerable discrepancy, of the order of a few seconds or a few minutes, in the time-points of detection of relay operation state change and CB operation state change by the state change detection unit 41 of the power system monitoring and control host 14.

Also, although, in the protection and control terminal 12-1, first of all, the protective relay circuit (relay element) 21 is operated.

Then, in response to operation of protective relay circuit 21, the CBs 11a, 11b are tripped by means of the CB control circuit 22.

This order: "relay operation"→"CB tripping" is not guaranteed in the state change detection unit 41 of the power system monitoring and control host 14, for reasons such as positioning on the transmission format, as described above, and the so-called inversion phenomenon could occur, in which the CB tripping is detected first and then, subsequently, the relay operation is detected.

In this way, in the case of the conventional power system monitoring control system 10, when discrepancies occur between the time-point of detection of the CB operation state change, or the order "relay operation"→"CB tripping" is inverted, and it is difficult to correlate the CB operation state change with the relay operation state change that caused it.

Accordingly, utilizing the fact that the maximum value T1 of the discrepancy between the time-point of relay operation state change detection and the time-point of CB operation state change detection can be found beforehand using the transmission rate/connection mode of the transmission system (transmission devices) from each protection and control terminal to the power system monitoring and control host and/or the details of signal exchange processing of each protection and control terminal and the power system monitoring and control host, and the fact that the CB state changes and the relay state changes that caused these CB state changes are restricted, in order to execute a correlation of the CB operation state changes and relay operation state changes irrespective of the discrepancy of state change detection times referred to above and/or the sequence of state changes, the system monitoring control system 10 is provided with a CB relay correlation database storage unit 48 that stores a database (CB relay correlation database) associating the state changes of each CB of the power system 11 and the protective relay state changes corresponding to the state changes of the CBs.

The CB relay correlation unit 43 compiles a associated state change message by performing a correlation of the CB operation state change and relay operation state change by referring to the CB relay correlation database of CB relay correlation database storage unit 48, using the transmitted state change data.

As shown in FIG. 15, in the CB relay correlation database that is stored in the CB relay correlation database storage unit 48, are associated and held beforehand: all of the CBs (for example the CB located on the XX transmission line 1L of a substation C and the CB located on the XX transmission line 2L of the substation C, etc.) of the power system 11 constituting the subjects of tripping/closure operation (subjects of correlation) of all the protection and control terminals 12-1–12-n, all the protective relay circuits (relay elements) that may be considered as causes of such operation when state change of these CBs occurs {closed→(tripping direction), open→closed (closure direction)}, and the re-closure circuits.

Specifically, the CB relay correlation unit 43 determines (checks) (step S1 in FIG. 16) whether the state change data (for example state change data D2) that is sent from state change detection unit 41 is a CB state change or not and, if, as a result of this check, it finds that the data do not represent a CB state change, shifts to the next state change data processing and terminates processing.

Now, since the state change data D2 represents a CB state change, the result of the check of step S1 is YES.

The CB relay correlation unit 43 assumes a standby state (step S2) in which processing is tripped until the maximum time T1 of the discrepancy mentioned above has elapsed after the time-point of detection of CB state change in the state change data.

When the time T1 after the time-point of detection of the state change of the CB has elapsed, the CB relay correlation unit 43 gets all the state change data group (which may be assumed to include for example the state change data D1) that were stored in the state change data file storage unit 42 in the range of time T1 before and after the time-point of detection of the CB state change (step S3) and, by referring to the CB relay correlation database stored in the CB relay correlation database storage unit 48, checks whether or not this state change data group includes a relay state change whose association with the CB of state change data D2 that has been transmitted (CB located on XX transmission line 1L of substation C) (step S4).

If now the CB relay correlation database includes in the relay elements associated with the CB on the XX transmission line 1L of substation C "substation C XX transmission line 1L main protection", the relay element whose state has changed in the state change data D1 in the state change data that was acquired by the processing of step S3 is "substation C XX transmission line 1L main protection (ground fault)".

Thus, an association of the CB state change and relay state change is established (result of the check of step S4 is YES), and a state change message (see FIG. 14 referred to above) in which the state-changed CB and the state-changed relay element are associated is compiled (step S6).

In contrast, if the result of the check of step S4 is NO i.e. if, on referring to the CB relay correlation database, it is found that no relay state change corresponding to the CB state change is to be found in all the state change data that was read by the processing of step S3, CB relay correlation unit 43 recognizes that this CB state change was a CB state change due to some cause other than operation of a relay element, in other words, was due to manual operation of the equipment, and therefore compiles a state change message consisting of a message in which CB state change due to manual operation of the equipment is displayed (step S7).

The CB relay correlation unit 43 then stores the state change message compiled by the processing of step S6 and step S7 in the associated state change message file storage unit 44 (step S8).

As a result, even when there is a discrepancy (maximum T1) between the time-point of relay operation state change detection and the time-point of CB operation state change detection or the order: "relay operation"→"CB tripping" is not guaranteed, by comparing the state change data expressing the CB state change with all of the state change data present in the range of T1 before and after the detection time-point of this state change data, a state change message in which the CB state change and the relay state change that caused this CB state change are associated (or state change message expressing the fact that the CB state change is due to manual equipment operation) can be stored in the associated state change message file storage unit 44.

Also, the stored state change messages can be displayed on a display by processing of the CB operation display unit 45.

As described above, in a conventional power system monitoring and control system, the correlation processing of the CB operation state changes and relay operation state changes is performed at the power system monitoring and control host side by sending the CB state change data obtained by the protection and control terminals and the relay state change data to the power system monitoring and control host.

Therefore, there is a possibility of considerable discrepancy between the time-point of relay operation state change detection and the time-point of CB operation state change detection, or the order of these could be reversed.

It is difficult to correlate accurately and rapidly the CB operation state changes and relay operation state changes that caused them.

Specifically, since the CB relay correlation unit of the power system monitoring and control host of the conventional power system monitoring control system has to extract from the state change data file storage unit all of the state change data (state change data of all of the protection and control terminals: total state change data) that is found in a range of time T1 before and after the time of detection of the state change data of this CB, every time CB state change data has to be transmitted from any of the protection and control terminals.

After that, the conventional power system monitoring control system had to perform correlation processing with this total state change data for each CB state change data.

Therefore, the amount of data that is handled by the CB relay correlation unit is extremely large and the correlation algorithm is also complicated.

That is, the CB operation state changes and relay operation state changes whose associations are established are restricted.

But, a large number of state change data (the state change data of all the protection and control terminals) has to be correlated with any given CB state change data, so an enormous time is required for the correlation processing.

In particular, although the amount of state change data that needs to be handled by the CB relay correlation unit depends on the maximum time T1 of the discrepancy between the time-point of detection of relay operation state change and the time-point of detection of CB operation state change, supposing that the maximum value T1 of the discrepancy time is wrongly selected, this T1 being set too short, there is a high risk of correlation overflow or a risk of occurrence of display less of the relays operated in response to the CB operation state change.

On the other hand, if, in order to avoid display less of the relays operated in response to CB operation state change, the maximum value T1 of the discrepancy time is set to a larger value, there is a risk that each item of CB state change data would have to be correlated with an even larger number of state change data. It increases the correlation processing load, further increasing the correlation processing time.

Thus, with the conventional power system monitoring control system, when power system equipment/devices such as CBs or relays (relay elements) are added in the power system, the association of CBs and the relays (relay elements) effecting open/closure operation of these CBs have to be.

Every time such addition or alteration of association occurs, it is necessary to perform a maintenance operation involving addition of data relating to the added equipment/devices or association alternations to the CB relay correlation database stored in the CB relay correlation database storage unit of the power system monitoring and control host. This takes a large amount of time.

SUMMARY OF THE INVENTION

It is an object of the present invention to provide a system which performs correlation processing of CB operation state change and relay operation state change easily and rapidly without employing a CB relay correlation database.

In order to solve the problem mentioned above, the inventors of the present invention noted that, as the transmission system between the protection and control terminals and power system monitoring and control host in the power system monitoring and control system, a communication network such as an LAN or WAN whereby mutual communication of larger volumes and higher rates of data can be achieved than with the conventional TC devices or CDT devices could be applied, and that, if such a communication network were employed, special restrictions would be unnecessary even if a large amount of data is sent from the protection and control terminals to the power system monitoring and control host. Specifically, the inventors of the present application aimed at solving the problem described above by constructing the power system monitoring control system using such an LAN or WAN or the like communication network as the transmission system and by devising means for performing the correlation processing of the CB operation state change and the relay operation state change at the protection and control terminal side.

Specifically, with a power system protection and control system according to a first embodiment of the invention comprising at least one protection and control terminal that performs protection and control of the power system by operating a two-way switch in response to a state variable input from the power system; An electric power system protection and control system comprises a plurality of protection and control terminals, each for executing protection and control of an electric power system by inputting a status quantity; and a power system monitoring and control host connected to each of the protection and control terminals via a communication network, for monitoring and controlling an operation of the power system based on information sent from the protection and control terminals. And, each of the protection and control terminals comprises: correlating means for correlating a cause of operation with an operation state of a two-way switch operated, and sending means for sending a result of the correlating means to the protection and control terminals via the communication network, respectively. And the power system monitoring and control host comprises; receiving/displaying means for receiving the result of the correlating means via the communication network and displaying the result of the correlating means.

In the electric power system protection and control system according to the first embodiment, a 2nd embodiment shows that the electric power system protection and control system comprises: relay means for tripping the two-way switch in accordance with the status quantity of the power system. And, wherein the correlating means is provided with first judging means for judging whether the two-way switch is opened or closed in accordance with the operation state of the two-way switch, second judging means for judging whether a relay is operated in association with the two-way switch is opened when the first judging means judges the two-way switch is opened, first forming means for forming data as the result of the correlating means based on both data of the relay and the two-way switch after the second judging means, and second forming means for forming data as a correlation result, which the two-way switch is opened by a manual operation, when no operation in the two-way switch is judged by the second judging means.

In the electric power system protection and control system according to the 2nd embodiment, a 3rd embodiment further comprises: re-closing means for re-closing the two-way switch, wherein the correlating means is provided with, third judging means for judging whether the re-closing means is operated in accordance with the two-way switch when the two-way switch is judged by the first judging means as not being closed, third forming means for forming data as a correlation result, in which the two-way switch is operated, when the two-way switch is judged by the third judging means as being closed, and fourth forming means for forming data as a correlation result, in which the two-way switch is re-closed by the manual operation, when the third judging means judge that the two-way switch is closed, but the re-closing means is not executed.

In the electric power system protection and control system according to the 2nd embodiment, a 4th comprises: wherein the correlating means is provided with, fourth judging means for judging whether the relay is operated, fifth judging means for judging whether the two-way switch is re-closed within a fixed time corresponding to the relay being operated when the relay is judged as operated by the fourth judging means, and fifth forming means for forming data as correlation result, in which the two-way switch is failed to trip, when the two-way switch is judged as not re-closed within the fixed time by the fifth judging means.

In the electric power system protection and control system according to the 3rd embodiment, a 5th embodiment comprises: wherein the correlating means is provided with, sixth judging means for judging whether the re-closing means is executed, seventh judging means for judging whether the two-way switch is re-closed within a fixed time when the sixth judging means judge the re-closing means is executed, and sixth forming means for forming data as a correlation result, in which the two-way switch is failed to be re-closed, when the seventh judging means judge that the re-closing means is executed within a fixed time, but the two-way switch is not closed.

In the electric power system protection and control system according to the 3rd embodiment, a 6th embodiment comprises: wherein the correlating means is provided with, eighth judging means for judging whether the two-way switch is re-tripped when the third judging means judge that the two-way switch is closed and the re-closing means is executed, and seventh forming means for forming data as a correlation result, in which the two-way switch is failed to be re-closed, when the re-closing means is re-tripped within fixed time as judged by the eighth judging means.

In the electric power system protection and control system according to the 6th embodiment, a 7th embodiment furthermore comprises: wherein the correlating means is provided with, eighth forming means for forming data as a correlation result, in which means the two-way switch is re-closed, when the two-way switch is not re-tripped within the fixed time as judged by the eighth judging means.

In the electric power system protection and control system according to the 1st embodiment, a 8th embodiment comprises: the sending means is provided with; converting means for converting data sent by the correlating means into converted data based on a predetermined format, and sending means for sending the converted data to the receiving/displaying means via a communication network, wherein the receiving/displaying means is provided with, first receiving means for receiving the converted data from sending means, displaying means for displaying the correlation result based on the converted data.

In the electric power system protection and control system according to the 1st embodiment, a 9th embodiment comprises: wherein the correlating means makes at least one of operation time, two-way switch name, direction of operation, and operational area, related to the two-way switch name, as the correlation result.

In the electric power system protection and control system according to the 1st embodiment, a 10th embodiment related to the electric power system protection and control system has a program storing medium readable by a computer, the medium storing a program of instructions executable by the computer to perform methods steps for an electric power system protection and control system, this embodiment comprises a plurality of protection and control terminals, each for executing protection and control of an electric power system by inputting a status quantity; and a power system monitoring and control host connected to each of the protection and control terminals via a communication network, for monitoring and controlling an operation of the power system based on information sent from the protection and control terminals, the method comprising the steps of: correlating an operation of a two-way switch with the cause of the operation, and sending a result of the correlating steps to the power system monitoring and control host via the communication network, respectively, and further more the program storing medium comprises: wherein executing correlating means steps comprising; executing first judging means step for executing the first judging means for judging whether the two-way switch is opened or closed in accordance with a operation of the two-way switch; executing second judging means step for executing the second judging means for judging whether relay is operated in association with the two-way switch is opened when the first judging means judge that the two-way switch is opened; executing first forming means step for executing the first forming means for forming data as the result of the correlating means based on both data of the relay and the two-way switch after the second judging means; and executing second forming means step for executing the second forming means forming data as a correlation result, which the two-way switch is opened by manual operation, when no operation in the two-way switch is judged by the second judging means.

Furthermore, with a power system protection and control system according to a 11th embodiment of the invention comprises: at least one protection and control terminal that performs protection and control of the power system by operating a two-way switch in response to a state variable input from the power system; An electric power system protection and control system comprises a plurality of protection and control terminals, each for executing protection and control of an electric power system by inputting a status quantity, and a power system monitoring and control host connected to each of the protection and control terminals via a communication network, for monitoring and controlling an operation of the power system based on information sent from the protection and control terminals. And, each of the protection and control terminals comprises; a plurality of protection and control terminals, each for executing protection and control of an electric power system by inputting a status quantity, and a power system monitoring and control host connected to each of the protection and control terminals via a communication network, for monitoring and controlling an operation of the power system based on information sent from the protection and control terminals. Each of the protection and control terminals comprises: a correlation circuit to correlate a cause of operation with an operation state of two-way switch operated, and a correlation result transmission circuit sending a result of the correlation circuit to the protection and control terminals via the communication network, respectively. The power system monitoring and control host comprises; a correlation result reception unit to receive sending the result of the correlation circuit, a CB operation display unit to display the result of the correlation received by the correlation result reception unit.

In the electric power system protection and control system according to the 11th embodiment, a 12th embodiment, further comprises: a protective relay circuit to trip the two-way switch in accordance with the status quantity of the power system, wherein the correlation circuit is provided with a CPU. The CPU comprises: a first judging unit judge whether the two-way switch is opened or closed in accordance with the operation state of the two-way switch, a second judging unit to judge whether a relay is operated in association with the two-way switch is opened when the first unit judges the two-way switch is opened, a first forming unit to form data as the result of the correlation result transmission circuit based on both data of the relay and the two-way switch after the second judging unit; and a second forming unit to form data as a correlation result, which the two-way switch is opened by a manual operation, when no operation in the two-way switch is judged by the second judging unit.

In the electric power system protection and control system according to the 12th embodiment, a 13th embodiment furthermore comprises: a re-closure circuit to re-close the two-way switch, wherein the correlation result transmission circuit is provided with a CPU. And the CPU comprises; a third judging unit to judge whether the re-closure circuit is operated in accordance with the two-way switch when the two-way switch is judged by the first judging unit as not being closed, a third forming unit to form data as a correlation result, in which the two-way switch is operated, when the two-way switch is judged by the third judging unit as being closed, and a fourth forming unit to form data as a correlation result, in which the two-way switch is re-closed by the manual operation, when the third judging unit judge that the two-way switch is closed, but the re-closure circuit is not executed.

In the electric power system protection and control system according to the 12the embodiment, a 14the embodiment furthermore comprises: wherein the correlation result transmission circuit is provided with a CPU. And the CPU comprises; a fourth judging unit to judge whether the relay is operated, a fifth judging unit to judge whether the two-way switch is re-closed within a fixed time corresponding to the relay being operated when the relay is judged as operated by the fourth judging unit, and a fifth forming unit to form data as correlation result, in which the two-way switch is failed to trip, when the two-way switch is judged as not re-closed within the fixed time by the fifth judging unit.

In the electric power system protection and control system according to the 13the embodiment, a 14th embodiment furthermore comprises: wherein the correlation result transmission circuit is provided with a CPU. And the CPU comprises; a sixth judging unit to judge whether the re-closure circuit is executed, a seventh judging unit to judge whether the two-way switch is re-closed within a fixed time when the sixth judging unit judge the re-closure circuit is executed, and a sixth forming unit to form data as a correlation result, in which the two-way switch is failed to be re-closed, when the seventh judging unit judge that the re-closed circuit is executed within a fixed time, but the two-switch is not closed.

In the electric power system protection and control system according to the 13th embodiment, a 15th embodiment furthermore comprises: wherein the correlation result transmission circuit is provided with a CPU. And the CPU comprises; a eighth judging unit to judge whether the two-way switch is re-tripped when the third judging unit judge that the two-way switch is closed and the re-closure circuit is executed, and a seventh forming unit to form data as a correlation result, in which the two-way switch is failed to be re-closed, when the re-closure circuit is re-tripped within fixed time as judged by the eighth judging unit.

In the electric power system protection and control system according to the 15th embodiment, a 16th embodiment furthermore comprises: wherein the correlation result transmission circuit is provided with, a eighth forming unit to form data as a correlation result, in which means the two-way switch is re-closed, when the two-way switch is not re-tripped within the fixed time as judged by the eighth judging unit.

In the electric power system protection and control system according to the 11th embodiment, a 17th embodiment furthermore comprises: wherein the correlation result transmission circuit is provided with, a converting unit to convert data sent by the correlation circuit into converted data based on a predetermined format, and a sending unit to send the converted data to the correlation result reception unit via a communication network, wherein the correlation result reception unit is provided with, a first receiving unit to receive the converted data from sending unit, a displaying unit to display the correlation result based on the converted data.

In the electric power system protection and control system according to the 11th embodiment, a 18th embodiment furthermore comprises: wherein the correlation result transmission circuit makes at least one of operation time, two-way switch name, direction of operation, and operational area, related to the two-way switch name, as the correlation result.

Furthermore, a 19th embodiment comprises at least one protection and control terminal that performs protection and control of the power system by actuating a switch in response to a state variable input from the power system; and a power system monitoring and control host that performs monitoring and control of the power system in accordance with data transmitted from the at least one protection and control terminal, being mutually connected with this at least one protection and control terminal in such a manner that data can be exchanged through a communication network, wherein the at least one protection and control terminal comprises correlation means that perform correlation of the operated switch and the cause of its operation when the switch is operated, and correlation result transmission means that transmit the result obtained by the correlation processing of this correlation means to the power system monitoring and control host through the communication network; and the communication monitoring device comprises correlation result reception and display means that receives and displays the correlation result transmitted through the communication network from the correlation result transmission means.

In particular, in the power system monitoring and control system according to the 19th embodiment, the at least one protection and control terminal comprises a relay element that trips a corresponding switch when operated in response to the state variable, and the correlation means comprises: a first checking means that checks to ascertain whether the switch that has been operated in response to the operation state of the switch in question, that was acquired from the switch, was tripped or closed; second checking means that, when, as a result of the checking of the first checking means, it is ascertained that the switch that has been operated is tripped, checks to find whether or not the relay element corresponding to this switch that has been operated was operated; first generating means that, if, as a result of the checking of this second checking means it is found that the relay element was operated, generates as the correlation result data in which the relay element that was operated and the switch that was tripped are associated; and second generating means that, if, as a result of the checking of the second checking means, it was concluded that the relay element was not operated, generates as the correlation result data expressing the fact that the switch in question was tripped by manual operation of the device.

Also, in the power system monitoring and control system according to claim the 19th embodiment, wherein the at least one protection and control terminal comprises re-closure means capable of executing re-closure control for the switch, and the correlation means comprises: third checking means that, if, as a result of the checking of the first checking means, it is ascertained that the operated switch has been closed, checks to ascertain whether or not the re-closure means is executing re-closure control for the switch that was closed; third generating means that if, as a result of the checking of this third checking means, it is ascertained that re-closure control is being executed by the re-closure means for the switch that was closed, generates as the correlation result data expressing the fact that closure of the switch in question was effected by re-closure control; and fourth generating means that, if, as a result of the checking of the third checking means, it is ascertained that re-closure control is not being executed for the switch that was closed, generates as the correlation result data expressing the fact that the switch in question was closed by manual operation of the device.

With a power system monitoring and control system according to the 19th embodiment constructed in this way, if for example, at least one of a plurality of switches is operated, the first checking means checks to ascertain whether the switch that has been operated was tripped or closed, by using the operation states of the plurality of switches obtained from these plurality of switches, and if, as a result of this checking, it ascertains that the operated switch was tripped, the second checking means checks to ascertain whether or not the relay element corresponding to the operated switch was operated.

If, as a result of the checking of this second checking means, it is found that a relay element was operated, the first generating means generates as the correlation result data in which the operated relay element and tripped switch are associated, and if, as a result of the checking of the second checking means, it is found that no relay element was operated, the second generating means generates as correlation result data expressing the fact that the operated switch was tripped by manual operation of the device.

The correlation result transmission means transmits the correlation result generated by the first generating means or second generating means through the communication network to the power system monitoring and control host; at the power system monitoring and control host, the correlation result that was transmitted through the communication network from the correlation result transmission means is received and displayed by the correlation result reception and display means.

Also, according to a 20th embodiment of a power system protection and control terminal according to this invention, wherein protection and control of the power system is performed by actuating a switch in response to a state variable that is input from the power system, the protection and control terminal comprises correlation means that, when the switch is operated, effects a correlation of the operated switch and the cause of this operation.

Further, with a storage medium according to a 21th embodiment of this invention storing a program capable of being read by a computer constituting at least one protection and control terminal comprising a function of effecting protection and control of a power system by operation of a switch in response to a state variable input from the power system, and a function of transmitting data relating to the protection and control to a power system monitoring and control host for the power system monitoring and control through a transmission network, comprising: a procedure for executing correlation processing of the operated switch and the cause of its operation on operation of the switch, and a procedure for transmitting the result obtained by the correlation processing to the power system monitoring and control host through the communication network.

In particular, with a storage medium for storing a program according to the 21th embodiment, wherein: the computer constituting the at least one protection and control terminal is provided with a relay element that trips the switch in question, being operated in response to the state variable; and the correlation processing execution procedure comprises: a first checking procedure that checks to ascertain whether the switch that was operated in response to the operation state of the switch in question that was acquired from the switch was closed or tripped; a second checking procedure that, if, as a result of this first checking procedure, the operated switch was found to be tripped, determines whether or not the relay element corresponding to this switch that was operated is operated; a first generating procedure that, if, as a result of the checking performed by this second checking procedure, it is found that the relay element was operated, generates as the correlation result associated data of this operated relay element and the switch that was tripped; and a second generating procedure that, if it was found, as a result of the checking performed by the second checking procedure, the relay element was not operated, data expressing the fact that the switch in question was tripped by manual operation of the device is generated as the correlation result.

BRIEF DESCRIPTION OF THE DRAWINGS

A more complete appreciation of the invention and many of the attendant advantage thereof will be readily obtained and better understood by reference to the following detailed description when considered in connection with the accompanying drawings.

FIG. 6 shows the content of state change message data compiled in the first embodiment.

FIG. 9 is a flow chart showing diagrammatically an example of CB operation state change processing of the CPU of the correlation circuit in a power system monitoring and control system according to a fourth embodiment of the invention.

FIG. 13 shows the content of conventional state change data.

FIG. 14 shows the content of a conventional state change message.

FIG. 15 shows the content of a CB relay correlation database.

DETAILED DESCRIPTION OF THE PREFERRED EMBODIMENT

Numerous modifications and variations of the present invention are possible in view of the above teachings described below. It is therefore to be understood that within the scope of the appended claims, the invention may be practiced otherwise than as specifically described herein.

Embodiments of the invention are described below with reference to the drawings.

A power system protection and control system according to a first embodiment of the invention is described with reference to FIG. 1–FIG. 6.

Figure 1:
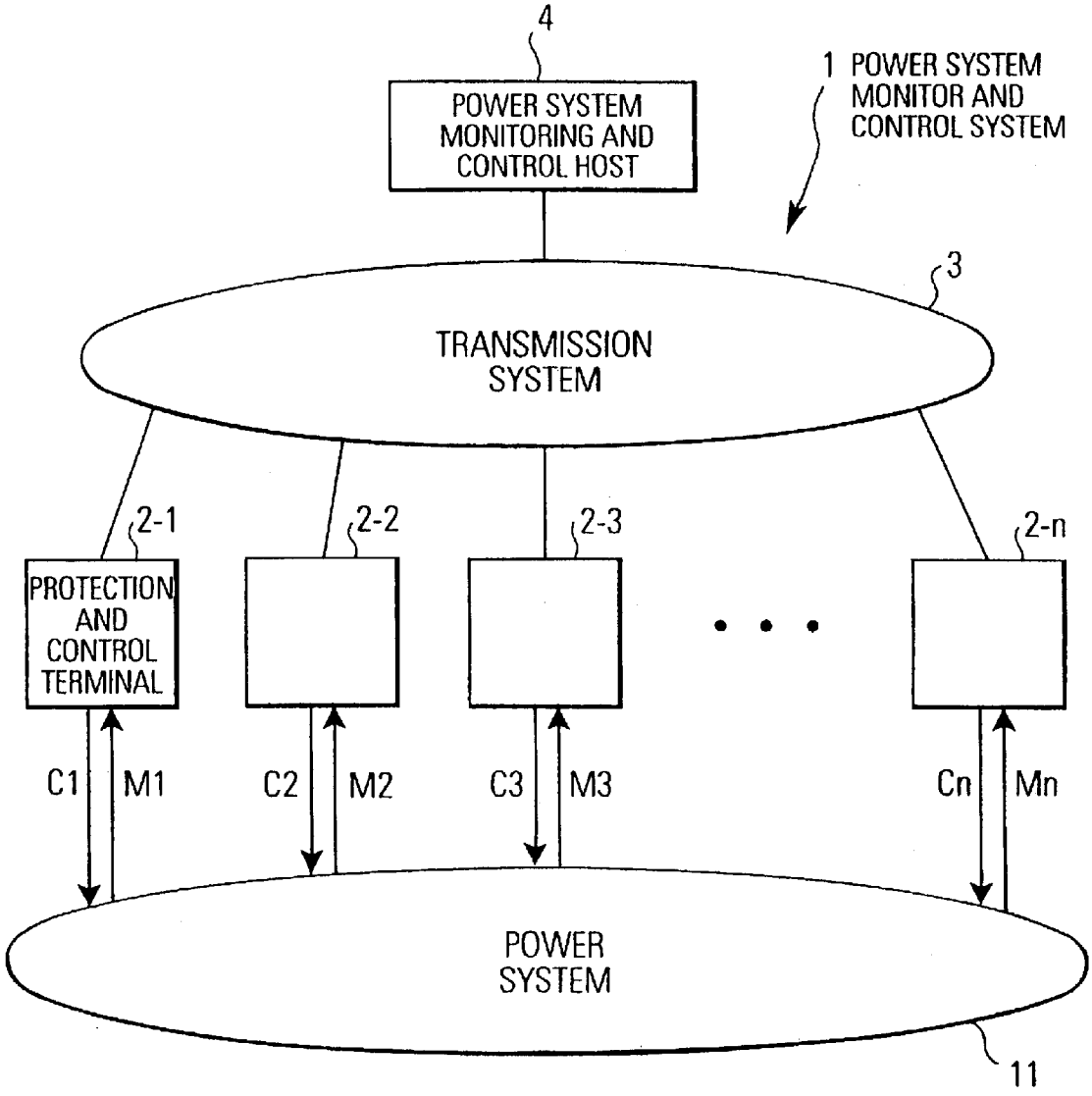
FIG. 1 shows the basic layout of a power system monitoring control system according to a first embodiment of the invention.

FIG. 1 shows the basic layout of a power system monitoring and control system 1 according to this embodiment.

The power system monitoring and control system 1 shown in FIG. 1 comprises a plurality of protection and control terminals 2-1–2-n.

The protection and control terminals 2-1–2-n processing performs control of the plurality of state variables (electrical quantities) M1–Mn such as current or voltage input from for example substations (substation A, substation B, substation C, . . . ) constituting a power system 11.

The protection and control terminals 2-1–2-n perform protection and control of the power system 11 by sending to the power system 11 protection and control outputs C1–C2 based on the protection and control processing result.

A power system monitoring and control host 4 receives data relating to the power system sent from this plurality of protection and control terminals 2-1–2-n through a transmission system 3, and that performs monitoring or control of the power system 11 using the power system data which is thus received.

As the transmission system 3 of this embodiment, a communication network such as a LAN or WAN that is capable of mutual communication of large volumes and high rates of data correlated with the conventional TC devices or CDT devices, is employed.

Figure 2:
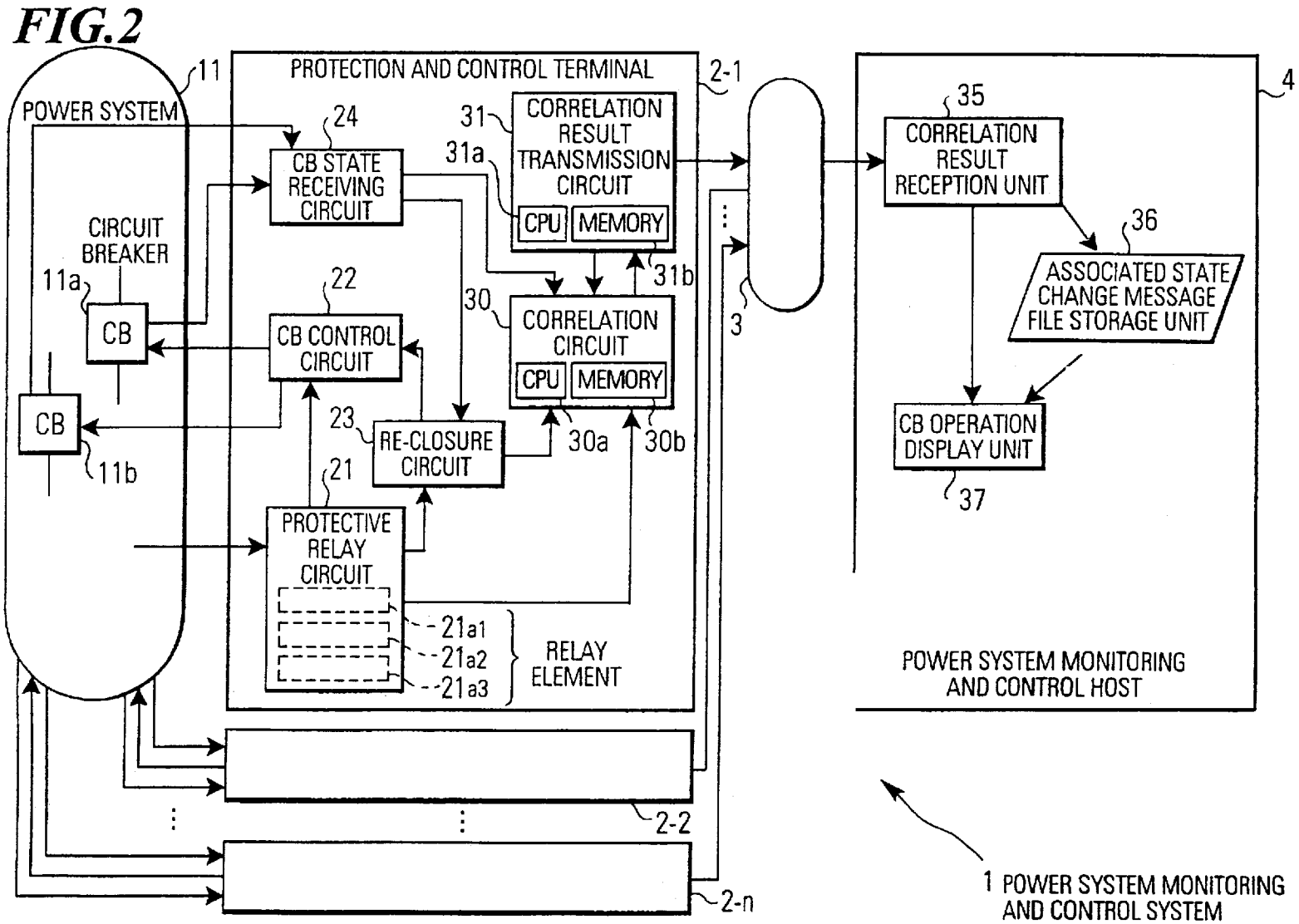
FIG. 2 shows a circuit block diagram of a protection and control terminal and power system monitoring and control host in the power system monitoring and control system of FIG. 1.

FIG. 2 shows a view showing a circuit block diagram of protection and control terminal 2-1 and power system monitoring and control host 4 in the power system monitoring control system 1 shown in FIG. 1.

Figure 12:
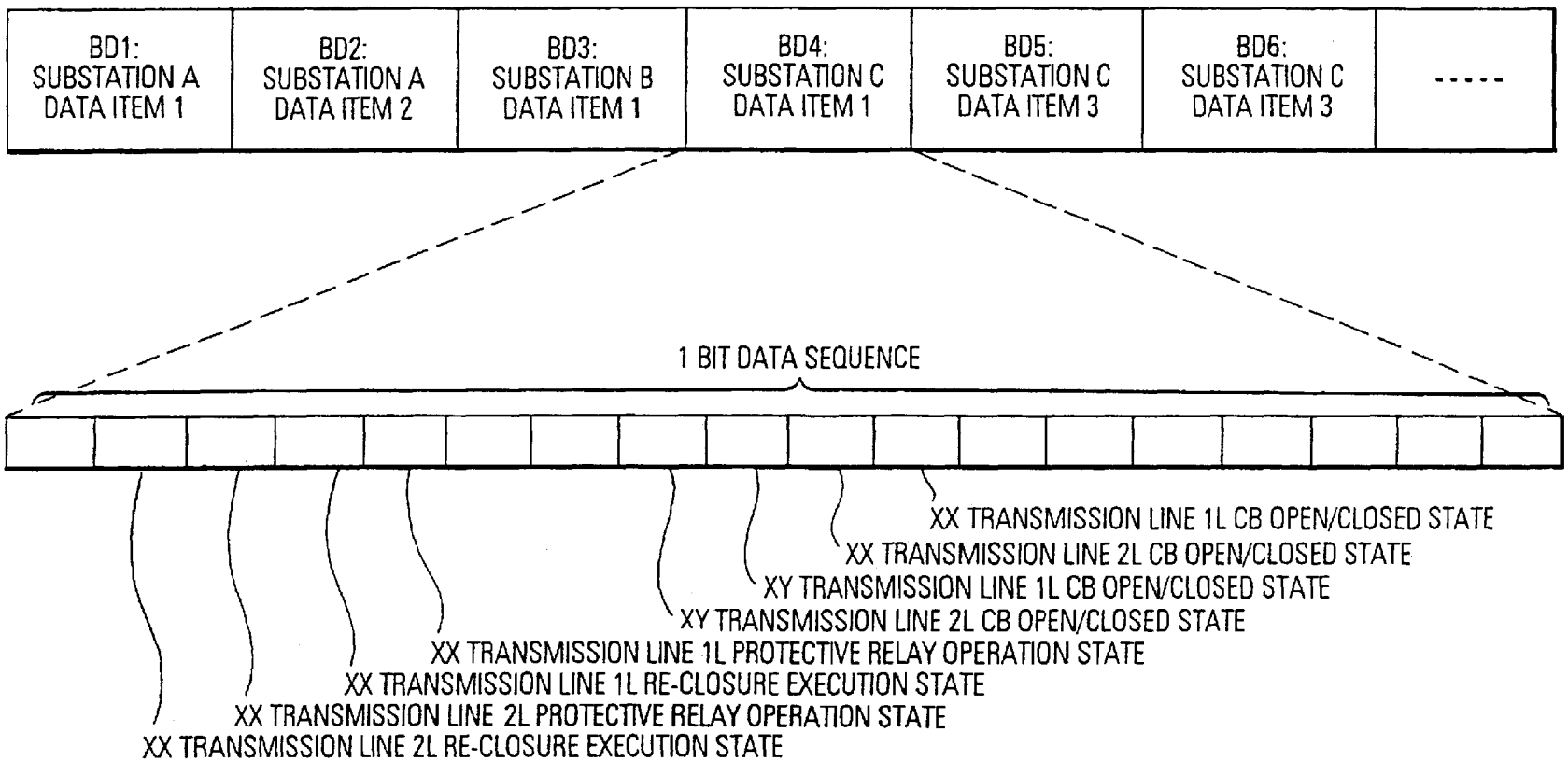
FIG. 12 shows an example of the transfer format of power system information received by a conventional power system monitoring and control host through a transmission system.
Figure 16:
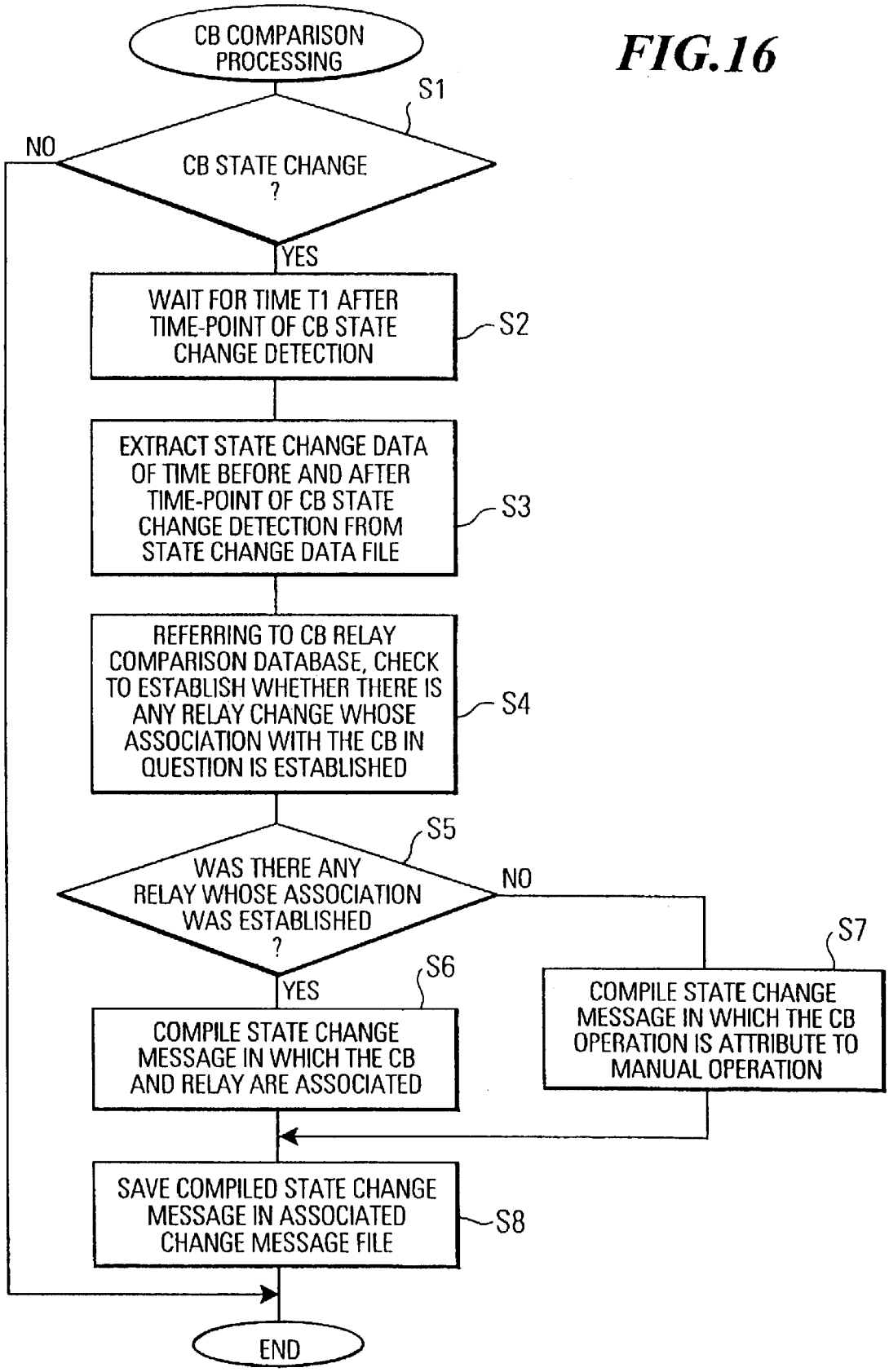
FIG. 16 is a flow chart showing diagrammatically an example of the CB relay correlation processing of a CB relay correlation unit in FIG. 11.

Although in FIG. 2 only the circuit block diagram of the single protection and control terminal 2-1 is illustrated, the circuit block diagrams of the other protection and control terminals 2-2–2-n being omitted, their circuit block diagrams are identical with that of the protection and control terminal 2-1. Also, constructional elements that are practically identical with constructional elements of the circuit block diagram of the protection and control terminal 12-1 shown in FIG. 12 above are given the same reference numerals and further description is abbreviated or omitted.

The protection and control terminal 2-1 in FIG. 2 includes a CPU 30a, a correlation circuit 30 and a correlation result transmission circuit 31.

The memory 30b stores a CPU 30a and program or data, etc. necessary for the processing of the CPU 30a.

The correlation circuit 30 performs correlation processing of a CBs 11a, 11b and a relay elements 21a1–21a3, using the operation state of the relay elements 21a1–21a3 of the protective relay circuit 21, the operation state of re-closure circuit 23 and the open/closed state of the CBs 11a, 11b obtained by CB state receiving circuit.

The correlation result transmission circuit 31 has a CPU 31a and a memory 31b for storing programs and data etc. necessary for the processing of this CPU 31a, and converts an associated state change message (state change message) compiled as the correlation result of the correlation circuit 30 into state change message data in accordance with a prescribed transmission format, and sends the state change message data obtained by this conversion process through the transmission system 3 to a power system monitoring and control host 4.

To the CPU 30a of the correlation circuit 30, there are respectively periodically transmitted the open/closed state (open or closed) of CBs 11a, 11b from CB state a receiving circuit 24, the operation state of the relay elements 21a1–21a3 of a protective relay circuit 21 (operated or reset) and the operated state (executing re-closure or reset) of the re-closure circuit 23.

The CPU 30a of the correlation circuit 30 performs operation processing in accordance with an algorithm (flow chart: see FIG. 3) relating to CB operation state change processing stored in the memory 30b, using the open/closed state of the CBs 11a, 11b that has thus been transmitted, the operation state of the relay elements 21a1–21a3 of the protective relay circuit 21, and the operation state of the re-closure circuit 23.

Figure 3:
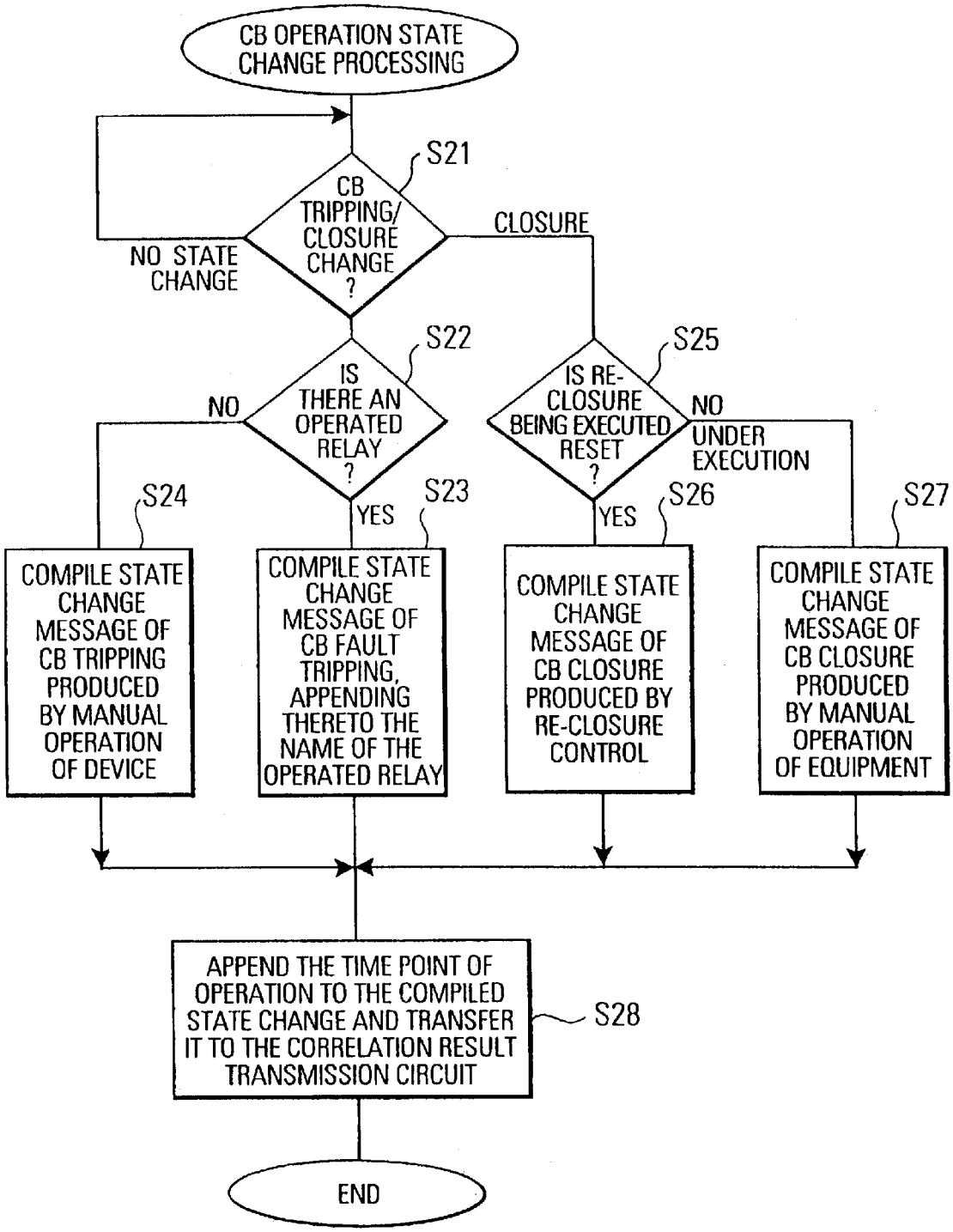
FIG. 3 is a flow chart showing diagrammatically an example of CB operation state change processing of the CPU of the correlation circuit.

Specifically, the CPU 30a of the correlation circuit 30 checks whether or not the open/closed state of the CBs 11a, 11b that has been transmitted has changed (whether a state change has occurred or not), and, if a state change has occurred (for example, the CB 11a), checks whether the state change of this CB 11a was tripping (closed→open) or closure (open→closed) (FIG. 3, step S21).

If the result of this checking in step S21 is that no state change of the CB 11a has occurred (i.e. it is still open or still closed), the CPU 30a repeats the checking of step S21 for the open/closed state of the CB which is next transmitted to it.

In contrast, if, as a result of the checking of step S21, it is found that a state change of the CB 11a has occurred, if this CB state change is tripping (closed→open), the CPU 30a, using the operation state of the relay elements 21a1–21a3 of the protective relay circuit 21 that has been transmitted to it, checks to find whether or not these relay elements 21a–21a3 include any relay element that has been operated (step S22).

If the result of the checking of this step S22 is YES, i.e., operated relay elements (for example, the relay elements 21a1 and 21a2) are found, the CPU 30a determines that the CB 11a has been tripped due to some fault and associates the operation names of these operated relay elements 21a1 and 21a2 (for example main protection ground fault and backup ground fault) with the CB 11a that has been tripped, to compile a associated state change message for the CB fault tripping (step S23), and shifts to the processing of step S28, to be described.

Also, if the result of the checking of step S22 is NO, i.e., no operated relay element is found, the CPU 30a determines that tripping of this CB 11a was due to a manual operation of the equipment by an operator.

And an associated state change message which expresses the fact that CB tripping was due to a state change produced by the manual operation (step S24), before shifting to the processing of step S28, to be described later.

In contrast, if the result of the checking of step S21 is that a state change of the CB 11a has occurred and that this CB state change is closure (open→closed), the CPU 30a, using the operation state of the re-closure circuit 23 which has been transmitted to it, determines whether or not this re-closure circuit 23 is in the process of executing re-closure (step S25).

If the result of the checking of step S25 is YES, i.e., that the re-closure circuit 23 is executing re-closure, the CPU 30a determines that the state change of the CB 11a is a closure state change produced by re-closure control and therefore compiles an associated state change message expressing the fact that re-closure is being executed (success) due to the CB closure (step S26), and shifts to the processing of step S28, to be described.

Also, if the result of the checking of step S25 is NO. i.e., the re-closure circuit 23 is not executing re-closure (i.e. it is reset), the CPU 30a determines that the state change of the CB 11a above consisted in a closure state change produced by manual operation of the equipment by an operator, and so compiles an associated state change message (step S27) expressing CB closure due to a manual state change, and shifts to the processing of step S28, to be described.

Next, if the associated state change message compilation processing of any of step S23, step S24, step S26 and step S27 has been completed, the CPU 30a appends the CB operation time to the associated state change message that has been compiled, and transfers this associated state change message with this CB operation time-point appended to the correlation result transmission circuit 31 (step S28), whereupon processing is terminated.

Then, the CPU 31a of the correlation result transmission circuit 31 then performs operation processing in accordance with an algorithm (flow chart: see FIG. 4) stored in the memory 31b, using the associated state change message with the CB operation time-point appended which has been transmitted thereto from the correlation circuit 30.

Figure 4:
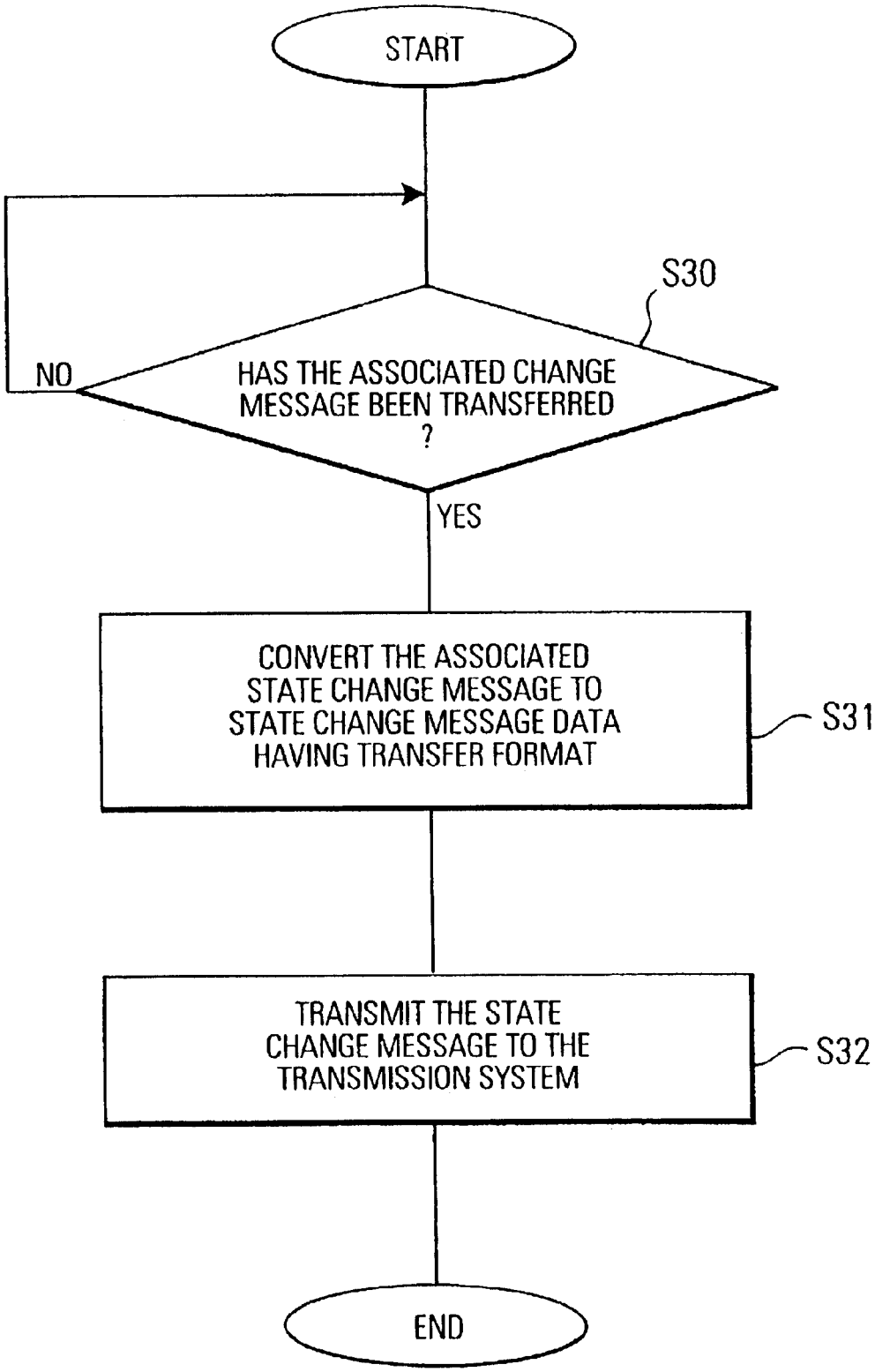
FIG. 4 is a flow chart showing diagrammatically an example of correlation result transmission processing of a CPU of the correlation result transmission circuit.

Specifically, the CPU 31a of the transmission result transmission circuit 31 checks to find whether or not an associated state change message has been passed from the correlation circuit 40 (FIG. 4, step S30).

Figure 5:
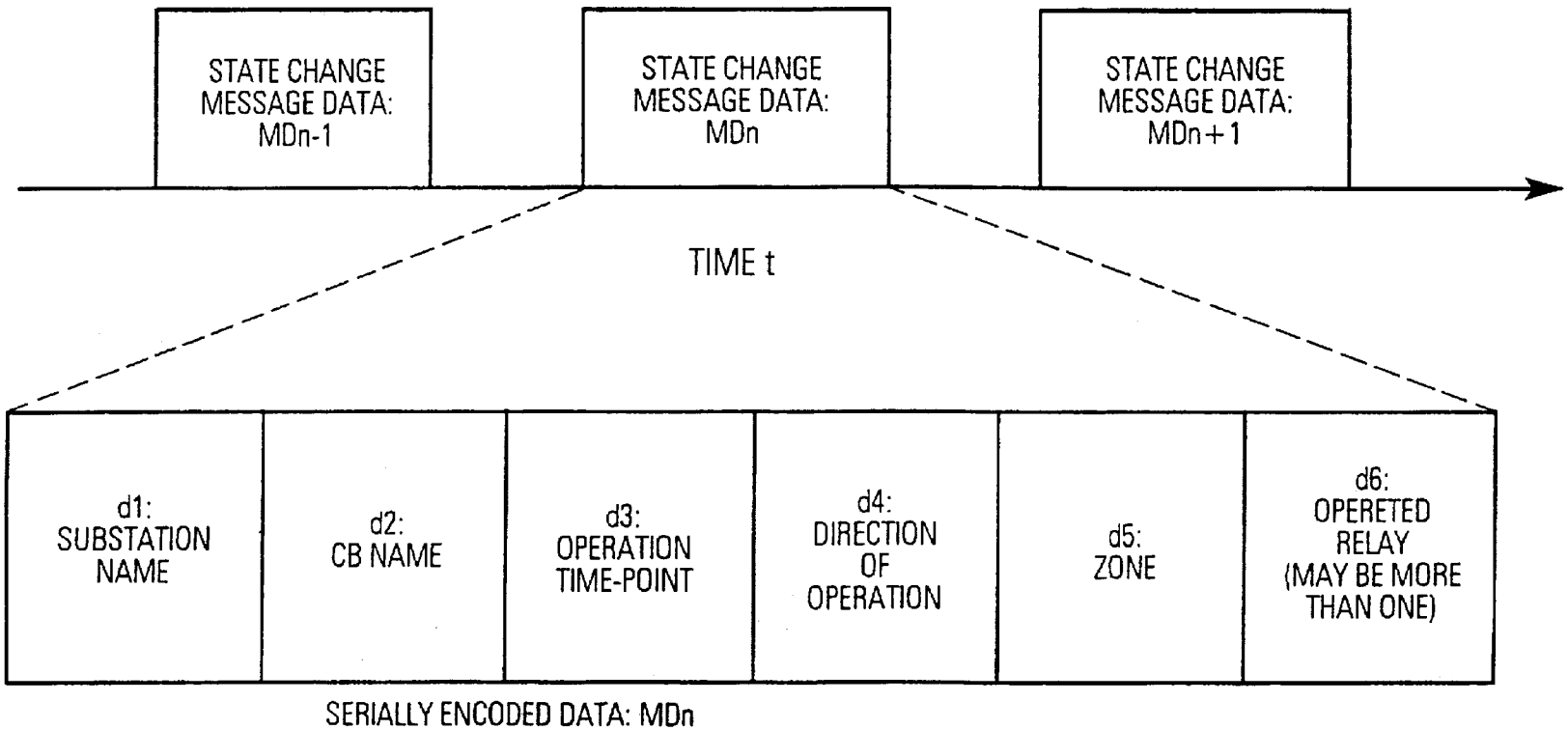
FIG. 5 shows the transmission format of conversion processing of the correlation result transmission circuit.

If an associated state change message has been passed from the correlation circuit 30 (result of checking of step S30 YES), it converts this associated state change message that has been passed to a state change message having a transmission format F as shown in FIG. 5 (step S31), and transmits this converted state change message data to transmission system 3 (step S32).

It then shifts to the processing of step S30, after which it executes sequentially the steps S30–step S32 described above on the state change message passed from correlation circuit 30.

The transmission format F determines the data structure of the state change message data that is sequentially transmitted from the correlation result transmission circuit 31 to the transmission system 3 {shown in time sequence in FIG. 5: state change message data MDa−1, state change message data MDn, state change message data MDn+1, . . . }.

Specifically, the various types of information (CB state change operation direction, name of operated relay (relay element) and time-point of CB state change operation) constituting the state change message passed from the correlation circuit 30 are located in a fixed order in accordance with the transmission format F shown in FIG. 5 to constitute the state change message data.

This embodiment is so constituted that, in transmission format F, the data expressing the name of the substation where the state-changed CB is located is first data d1, the data expressing the name of the state-changed CB is second data d2, the data expressing the time-point of the CB state change operation is third data d3, the data expressing the direction of CB operation is fourth data d4, the data expressing the zone of CB state change operation is fifth data d5, and the data expressing the name of the relay element operated in accordance with the CB state change is sixth data d6; a state change message in accordance with the above transmission format F is transmitted to the transmission system 3 as serially encoded data MDn.

The other circuit blocks (the protective relay circuit 21, the CB control circuit 22, the re-closure circuit 23 and the CB state change receiving circuit 24) could also be realized by computers provided with a CPU and memory etc.

The power system monitoring and control host 4 includes a correlation result reception unit 35, an associated state change message file storage unit 36 and a CB operation display unit 37.

The correlation result reception unit 35 receives the state change message data constituting the result of the correlation transmitted from the protection and control terminals 2-1–2-n through the transmission system 3 and that extracts the correlation result (state change message) contained in the state change message data in accordance with the transmission format F.

The associated state change message file storage unit 36 stores in the form of a file the correlation result (state change message) obtained by reception processing of the correlation result reception unit 35.

The CB operation display unit 37 reads the state change message file stored in the associated state change message file storage unit 36 and displays this on a display screen.

The circuit blocks described above (the correlation result reception unit 35, the associated state changes message file storage unit 36 and the CB operation display unit 37) may be respectively realized by way of a computer provided with a CPU and memory etc.

Next, the overall operation when a system fault occurs in the power system monitoring control system 1 according to this embodiment, in particular in the power system 11, will be described. It should be noted that, although in the first embodiment and in the embodiments which are subsequently described, only the operation of protection and control terminal 2-1 in a plurality of the protection and control terminals 2-1–2-n is described, but identical processing is performed by the other protection and control terminals 2-2–2-n.

Likewise, in the first embodiment and in the embodiments subsequently described, prior to occurrence of a system fault, the state: all CBs 11a, 11b→closed, all relay elements 21a1,–21a3 of the protective relay circuit 21→reset, and re-closure circuit 23 reset, is to be assumed.

When a system fault occurs in the power system 11, the state variables that are input to the protective relay circuit 21 from the power system 11 change in accordance with this system fault, causing a prescribed relay element of the protective relay circuit 21 to be operated in accordance with this change {for example relay element (main protective ground fault of substation A) 21a1 and relay element (backup ground fault of substation A) 21a2}.

As a result, relay operation signals are respectively transmitted to the CB control circuit 22, the re-closure circuit 23 and the correlation circuit 30.

The CB control circuit 22 outputs a tripping instruction in accordance with the relay operation signals that have thus been transmitted to the CB (for example the CB on XY transmission line 2L of substation A) 11a corresponding to the operated relay elements 21a1 and 21a2, and, as a result, the CB 11a is tripped (closed→open).

The CB state receiving circuit 24 then periodically gets the open/closed state of CBs 11a, 11b so that the operation state (state change) of the CBs 11a, 11b including the operation state change (closed→open) resulting from tripping of the CB 11a is transmitted through the CB state receiving circuit 24 to the correlation circuit 30 and the re-closure circuit 23.

The correlation circuit 30, from the transmitted CB state change (closed→open) and relay operation signals (the relay element 21a1 and 21a2→operated), determines that the CB 11a was tripped due to a fault (see FIG. 3, steps S21–S22).

Then, the correlation circuit 30 compiles an associated state change message M1 expressing CB fault tripping (see FIG. 3, step S23). This compiled state change message M1 is sent to the correlation result transmission circuit 31, with the CB tripping time-point (for example, 10 hours 10 minutes 10 seconds) appended thereto (see FIG. 3 step S28).

Meanwhile, the re-closure circuit 23, on receiving the relay operation signal transmitted from the protective relay circuit 21 and the operation state (the CB 11a open) transmitted from the CB state receiving circuit 24, sends a re-closure execution signal to the CB control circuit 22 and the correlation circuit 30 after waiting for a predetermined time from the timing of this reception.

The CB control circuit 22 outputs a closure instruction to the CB 11a in response to the re-closure execution signal that has been transmitted, and, as a result, the CB 11a closes (open→closed).

The CB state receiving circuit 24 then sends the operation states of the CBs 11a, 11b including the operation state change (open→closed) produced by re-closure of the CB 11a to the correlation circuit 30 and the re-closure circuit 23.

From the transmitted CB state change (open→closed) and re-closure execution signal, the correlation circuit 30 concludes that the CB 11a has been closed by re-closure control (see FIG. 3 step S21 and step S25), and compiles an associated state change message M2 expressing the fact that re-closure is under execution (successful) due to CB closure (see FIG. 3 step S26).

This state change message M2 that has thus been compiled is transmitted to the correlation result transmission circuit 31, with the CB closure time-point (10 hours 10 minutes 11 seconds) appended thereto (see FIG. 3, step S28).

If the state change (open→closed) of CB 11a on YZ transmission line 1L of substation B for example and re-closure reset are transmitted to the correlation circuit 30, the correlation circuit 30 concludes that the CB 11a has been closed by a manual operation of the equipment (see FIG. 3 step S21 and S25) and compiles an associated state change message M3 expressing CB closure produced by manually-operated state change (see FIG. 3 step S27).

This state change message M3 which has thus been compiled is then sent to the correlation result transmission circuit 31 with the CB closure time-point (for example, 20 hours 10 minutes 01 seconds) appended thereto.

The correlation result transmission circuit 31 compiles respective state change message data MD1–MD3 by state change processing in accordance with the transmission format F shown in FIG. 5 from the state change message M1 sent from the correlation circuit 30 (in the event of CB fault tripping), state change message M2 (in the event of CB closure produced by re-closure action) and state change message M3 (in the event of CB closure produced by manual operation) (see FIG. 4 steps S30–31).

Specifically, as shown in FIG. 6, as state change message data MD1 there is compiled encoded data in which the following are located in series: bit data expressing "substation A" (first data d1), bit data expressing "XY transmission line 2L CB" (second data d2), bit data expressing "10 hours 10 minutes 10 seconds" (third data d3), bit data expressing "tripped" (fourth data d4), bit data expressing "fault state change" (fifth data d5) and bit data expressing "main protection ground fault", "backup ground fault" (sixth data d6).

Likewise, state change message data MD2 {serially encoded data includes "substation A", "XY transmission line 2L CB", "10 hours 10 minutes 11 seconds", "closure" and "re-closure success"} and state change message data MD3 {serially encoded data includes of "substation B", "YZ transmission line 1L CB", "20 hours 10 minutes 11 seconds", "closure" and "state change produced by manual operation"} are respectively compiled.

The compiled state change message data MD1–MD3 are received by the correlation result receiving unit 35 of the power system monitoring and control host 4 through the transmission system 3 and the correlation result (state change message) M1 contained in state change message data MD1 in accordance with transmission format F "at 10 hours 10 minutes 10 seconds, the CB on XY transmission line 2L of substation A was tripped by a fault state change by operation of main protective ground fault 21a1 and backup short circuit relay 21a2" is extracted.

Likewise, the correlation result (state change message) M2 contained in state change message data MD2 "at 10 hours 10 minutes 11 seconds, the CB on the XY transmission line 2L of substation A was closed by re-closure control" and the correlation result contained in the state change message data MD3 (state change message) M3 "at 20 hours 10 minutes 01 seconds, the CB on the XZ transmission line 1L of substation B was closed by manual state change" are respectively extracted.

The extracted correlation results (state change messages) M1–M3 are stored in the associated state change message file storage unit 36 in file form as respective state change message files MF1–MF3.

The state change message files MF1–MF3 stored in the associated state change message file storage unit 36 are then read by the CB operation display unit 37. A display device is then used to effect display in the form of a display screen expressing the content of these state change messages M1–M3 {for example a table as shown in FIG. 6 or a display screen wherein the state changed CB symbol and relay operation (re-closure operation) symbol are superimposed on a system diagram}.

As described above, with this construction, utilizing the fact that protection and control terminals 2-1–2-n and the power system monitoring and control host 4 are connected by means of the transmission system (communication network) 3 such as the LAN or WAN, the correlation or relay operation (or re-closure control) and CB state change is effected at the protection and control terminals 2-1–2-n side.

The result of the correlation is obtained and transmitted to the power system monitoring and control host 4 thorough the transmission system 3, where it is subjected to display processing.

That is, since the correlation processing of the relay operation (re-closure control) and CB state change produced by this relay operation (re-closure control) is performed at the side of the protection and control terminals 2-1–2-n, the order of this relay operation (re-closure control) and CB state change produced by this relay operation (re-closure control) is always guaranteed (relay operation→CB state change produced by this relay operation).

Also, with this construction, since relay operation and CB state change are located to be detected by protection and control terminals 2-1–2-n instead of being detected at the power system monitoring and control host 4 side through the transmission system 3, there is no need to consider the discrepancy time T1 between the relay operation detection time-point and CB state change detection time-point.

There is no possibility of correlation overflow or increase of correlation processing time caused by the setting of the discrepancy time T1.

As described above, with this embodiment, the order of relay operation and CB state change produced by such relay operation is always guaranteed, and there is no need to consider the discrepancy time T1 between the time-point of relay operation detection and the time-point of CB state change detection.

So, a CB relay correlation database for performing correlation processing without involvement of the effects of such operation order inversion or discrepancy time T1 becomes unnecessary, and the work of maintenance of such a CB relay correlation database also becomes unnecessary.

Furthermore, since, with this construction, the correlation processing of CB state change and relay operation (re-closure control) is executed at the protection and control terminals 2-1–2-n, and the relay elements that cause CB state change (for example, state change of the CB 11a) occurring within the protection and control terminals 2-1–2-n are restricted to a small number of relay elements (for example two relay elements: the CB 11a→relay elements 21a1, 21a2 and one relay element: CB 11b→relay element 21a3), correlation processing can be performed very accurately, easily and rapidly, correlated with the conventional case, where correlation processing is performed of the CB state change data with all of the state change data of the protection and control terminals 2-1–2-n.

Also, with this construction, since the time-point at which the CB state change is detected can be appended to the state change message at the protection and control terminals 2-1–2-n, a very precise CB state change detection time-point can be displayed on the display of the power system monitoring and control host 4, correlated with the case where, as conventionally, the CB state change detection time-point is appended to the state change message at the power system monitoring and control host after passing through the transmission system.

Although in this embodiment a structural element corresponding to the state change data file storage unit shown in previous FIG. 21 is omitted, the invention is not restricted to this embodiment.

For example, the state change data file storage unit 42 as shown in FIG. 1 could be added as a structural element of the power system monitoring and control host 4.

At this point, the correlation circuit 30 compiles state change data as shown in the previous FIG. 23 in parallel with the correlation processing described above and sends this to the power system monitoring and control host 4 through the correlation result transmission circuit 31 and the transmission system 3.

The correlation result reception unit 35 of the power system monitoring and control host 4, in addition to the correlation result reception processing described above, writes the state change data transmitted through the transmission system 3 in the state change data file storage unit 42 in a file form, after reception processing of the state change data that is transmitted through the transmission system 3.

Under a construction as described above, since the power system monitoring and control host 4, in addition to the state change message file which is the result of the correlation, can store a state change data file representing the state change data of each CB or relay element itself, the task •of system monitoring can be performed by utilizing the state change data file itself.

Therefore, this can contribute to improving the efficiency of system monitoring.

A power system protection and control system according to a second embodiment of the invention is described with reference to FIG. 7.

In the power system monitoring and control system 1A of this embodiment, since, apart from the processing of the CPU 30a of the correlation circuit 30 of the protection and control terminals 2-1–2-n in FIG. 2 and the processing of the CPU 31a of the correlation result transmission circuit 31 is different from those of the power system monitoring control system 1 described in the first embodiment.

Otherwise, the construction and operation of power system monitoring control system 1 illustrated in FIG. 2 is equivalent, so, in this embodiment, only the processing of a CPU 30a of a correlation circuit 30A and the processing of a CPU 31a of a correlation result transmission circuit 31A will be described, the rest of the description thereof being omitted.

Figure 7:
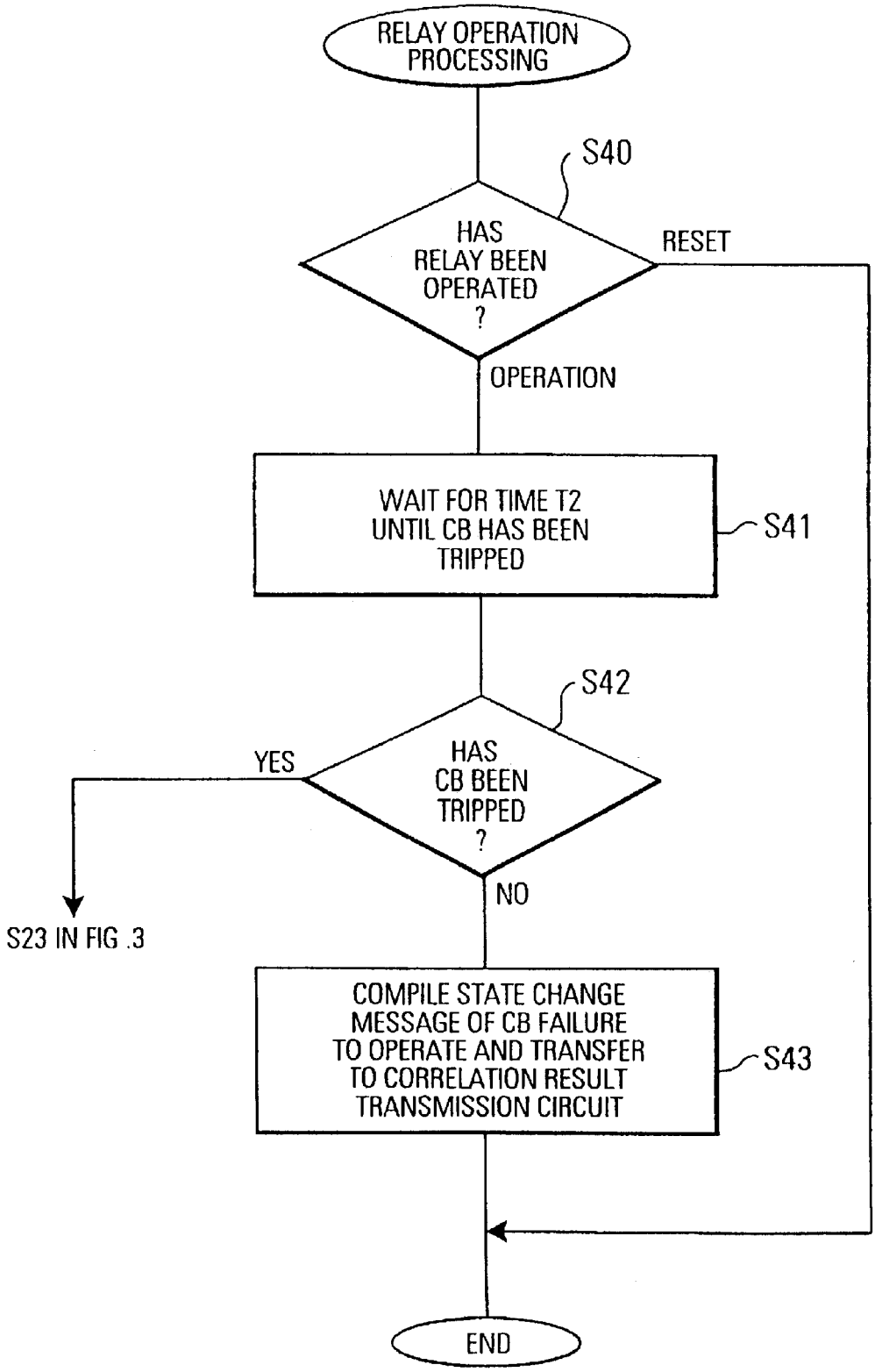
FIG. 7 is a flow chart showing diagrammatically an example of relay operation state change processing of the CPU of the correlation circuit in a power control and monitoring control system according to a second embodiment of the invention.

In addition to operation processing in accordance with the algorithm shown in previous FIG. 3, the CPU 30a of the correlation circuit 30A of this embodiment performs operation processing in accordance with the algorithm shown in FIG. 7 (flow chart), using the open/closed state of the CBs 11a, 11b, the operation state of relay elements 21a1–21a3 of the protective relay circuit 21 and the operation state of the re-closure circuit 23, which are transmitted thereto.

The processing of the CPU 30a of the correlation circuit 30A is described below with reference to the algorithm shown in FIG. 7.

Specifically, the CPU 30a of the correlation circuit 30A checks (FIG. 7, step S40) whether the operation state of the relay elements 21a1–21a3 is "operated" or "reset", by reference to whether or not a relay operation signal is transmitted from at least one the relay elements 21a1–21a3 of the protective relay circuit 21 for which transmission has been effected.

As a result of the decision in this step S40, in the state in which no relay operation signal has been sent from any of the relay elements 21a1–21a3 i.e. in which the operation state of the relay elements 21a1–21a3 is "reset", the CPU 30a terminates the processing.

On the other hand, if, as a result of the checking of step S40, a relay operation signal is transmitted from at least one relay element of the relay elements 21a1–21a3 (for example, the relay element 21a1 and 21a2) and the CPU 30a thereby recognizes that the operation state of the relay elements 21a1–21a3 is "operated", it waits for a maximum time of T2 (step S41) until the CB 11a corresponding to the relay elements 21a1 and 21a2 has been tripped.

This T2 is a waiting time corresponding to the time after operation of the relay elements 21a1 and 21a2 until CB 11a has been completely tripped.

After the waiting time T2, the CPU 30a determines whether or not the CB 11a has been tripped (step S42) based on the open/closed state of the CB 11a that has been transmitted.

If the result of the checking of this step S42 is YES, i.e., if the CB 11a has been tripped (closed→open), processing shifts to step S23 of FIG. 3, and the processing of step S23 and subsequent steps is performed.

In contrast, if the result of the checking of step S42 is NO, i.e., CB 11a is not tripped (CB 11a→stays closed), the CPU 30a compiles a state change message expressing CB erroneous non-operation (only relay operated), and transfers this state change message that has been compiled to the correlation result transmission circuit 31 (step S43), after which processing is terminated.

Also, the CPU 31a of the correlation result transmission circuit 31A, by performing the processing of steps S30–S32 of FIG. 4 on the state change message expressing the above CB erroneous non-operation (relay-only operation), instead of the associated state change message, sends the state change message data to the power system monitoring and control host 4 through the transmission system 3.

Next, the overall operation in the power system monitoring control system 1A of this embodiment, in particular when a system fault of the power system 11 occurs, will be described.

When a system fault occurs in the power system 11, the state variables that are input to the protective relay circuit 21 from the power system 11 change in accordance with this system fault, causing prescribed relay elements 21a1 and 21a2 of the protective relay circuit 21 to be operated in response to this change.

As a result, relay operation signals are respectively transmitted to the CB control circuit 22, the re-closure circuit 23 and the correlation circuit 30A.

The CB control circuit 22 outputs a tripping instruction to the CB 11a corresponding to operated the relay elements 21a1 and 21a2 in response to the relay operation signal that has been transmitted.

Thereupon, when the correlation circuit 30A receives the relay operation signals sent from the relay elements 21a1 and 21a2 of the protective relay circuit 21 that have been transmitted and thereby recognizes that the relay elements 21a1 and 21a2 are operated, it suspends processing for a time T2 after the receipt of this relay operation signal (see FIG. 7, steps S40 and S41).

Then, after suspending processing for the time T2, it performs a check to ascertain whether or not the CB 11a has been tripped, by referring to the open/closed state of the CB 11a that has been transmitted (see step S42).

If it then finds that the CB 11a has been tripped, it shifts to the processing of step S23 of FIG. 3, and executes the processing of step S23 and subsequent steps (such as compilation of state change message data representing fault tripping of the CB).

On the other hand, if the CB 11a has been tripped, the processing of the correlation circuit 30A causes a state change message to be compiled expressing CB erroneous non-operation (operation of the relay only), which is then transferred to correlation result transmission circuit 31A (see step S43).

Subsequently, by the processing of the CPU 31a of the correlation result transmission circuit 31A in the same way as in the first embodiment, based on the state change message Mk expressing "the CB 11a not operated, independent operation of the relay elements 21a1 and 21a2" that has been thus transferred, by conversion processing in accordance with the transmission format shown in FIG. 5, state change message data MDk expressing "erroneous non-operation of CB 11a, independent operation of the relay elements 21a1 and 21a2" is compiled.

This state change message data MDk that has thus been compiled is then sent through the transmission system 3 to the power system monitoring and control host 4.

By processing the correlation result reception unit 35, the state change message file storage unit 36 and the CB operation display unit 37 in the same way as in the first embodiment, the contents of the state change message are displayed on a display screen.

Specifically, with this construction, if, even though the relay elements 21a1 and 21a2 that would actuate the CB 11a have been operated, this CB 11a has not been tripped within a fixed time (T2) due to for example some defect or fault, this can be displayed as correlation result "CB erroneous non-operation, independent operation of relays".

Consequently, since the operator can see on the display screen information representing the fact that the relays have been operated independently without actuating the CB, in addition to the benefits of the first embodiment, he is able to rapidly undertake operation processing to deal with the situation described above of "CB erroneous non-operation, independent operation of relays".

A power system protection and control system according to a third embodiment of the invention is described with reference to FIG. 8.

In a power system monitoring and control system 1B of this embodiment, the processing of a CPU 30a of a correlation circuit 30 of the protection and control terminals 2-1–2-n in FIG. 2 and the processing of a CPU 31a of a correlation result transmission circuit 31 are different from those of the power system monitoring control system 1 described in the first embodiment, but the layout and operation are otherwise identical with those of power system monitoring and control system 1 shown in FIG. 2.

Therefore, in this embodiment, the processing of the CPU 30a of the correlation circuit 30B and the processing of the CPU 31a of the correlation result transmission circuit 31B only will be described, the rest of the description being omitted.

Figure 8:
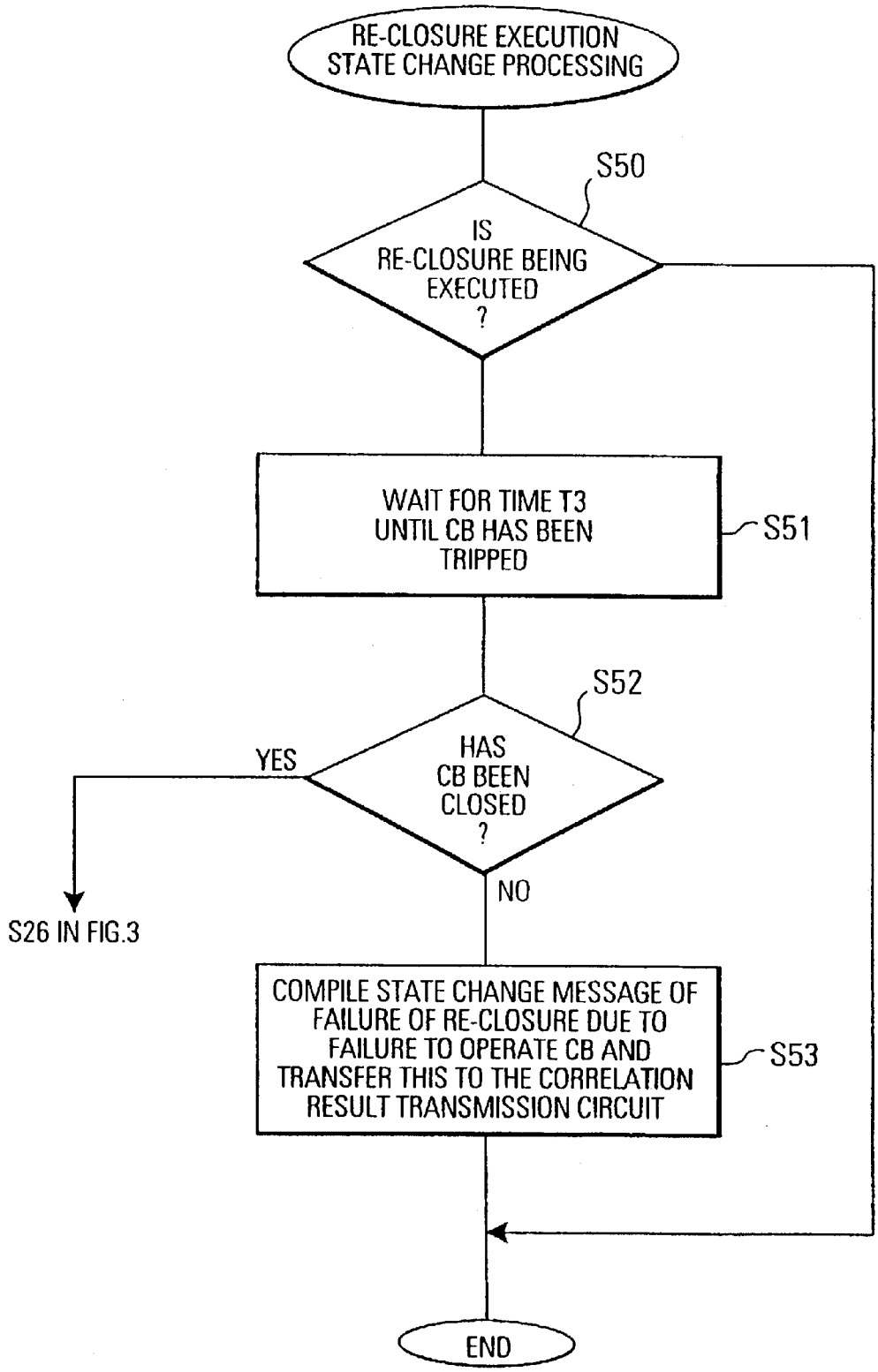
FIG. 8 is a flow chart showing diagrammatically an example of re-closure execution state change processing of a CPU of the correlation circuit in the power system monitoring and control system according to a third embodiment of the invention.

The CPU 30a of the correlation circuit 30B of this embodiment, in addition to the operation processing in accordance with the algorithm shown in previous FIG. 3, performs operation processing in accordance with the algorithm (flow chart) shown in FIG. 8, using the open/closed state of the CBs 11a, 11b, the operation state of the relay elements 21a1–21a3 of the protective relay circuit 21 and the operation state of the re-closure circuit 23 which have been transmitted thereto.

The processing of the CPU 30a of the correlation circuit 30B in accordance with the algorithm shown in FIG. 8 is described below.

Specifically, the CPU 30a of the correlation circuit 30B determines (FIG. 8 step S50), whether or not a re-closure execution signal is being sent from the re-closure circuit 23, and whether the operation state of the re-closure circuit 23 is "executing re-closure" or "reset".

As a result of this determination of step S50, it finds that no re-closure execution signal is being transmitted from the re-closure circuit 23 , i.e., the operation state of the re-closure circuit 23 is "reset", the CPU 30a terminates processing.

On the other hand, if the result of the checking performed in step S50 is that a re-closure execution signal is being transmitted from the re-closure circuit 23, whereby it is recognized that the operation state of the re-closure circuit 23 is "executing re-closure", the CPU 30a waits for a maximum time of T3 to allow closure of CB 11a that is the subject of re-closure execution (step S51). This T3 is a waiting time corresponding to the time from operation of the re-closure circuit 23 until the CB 11a is fully closed.

After waiting for time T3, the CPU 30a checks, using the open/closed state of the CB 11a that has been transmitted to ascertain whether the CB 11a has been closed or not (step S52).

If the result of this checking in step S52 is YES, i.e., that the CB 11a is closed (open→closed), it shifts to the processing of step S26 of FIG. 3 and executes the processing of step S26 and subsequent steps.

On the other hand, if the result of the checking of step S52 is NO, i.e., if the CB 11a is not closed (CB 11a→stays open), the CPU 30a compiles a state change message expressing CB non-operation (failure of re-closure).

The CPU 30a transfers this compiled state change message to the correlation result transmission circuit 31B (step S53), and terminates processing.

The CPU 31a of the correlation result transmission circuit 31b sends the power system monitoring and control host 4 through the transmission system 3 a state change message by performing the processing of step S30–step S32 of FIG. 4 on the state change message expressing CB non-operation (failure of re-closure) referred to above, instead of the associated state change message.

Next, the overall operation of the power system monitoring control system 1B of this embodiment, in particular on CB non-operation during execution of re-closure control will be described.

The operation processing of the protective relay circuit 21, the CB control circuit 22 and the CB state receiving circuit 24, as far as the sending of a re-closure execution signal to the CB control circuit 22 and the correlation circuit 30B in response to the CB 11a state change (closed→open) in accordance with the relay operation signals and system fault occurrence by the re-closure circuit 23, is the same as in the case of the first embodiment, so a description thereof is omitted.

The CB control circuit 22 outputs a closure instruction to the CB 11a in response to the re-closure execution signal that is sent from the re-closure circuit 23.

In the above, the control circuit 30B, when it receives the re-closure execution signal, suspends processing for a time T3 from receipt of this re-closure execution signal (see FIG. 8 step S50 and 51).

After the processing has been suspended for a time T3, a check is made (see step S52), based on the open/closed state of the CB 11a that has been transmitted, to find whether the CB 11a is closed or not. If it is then found that the CB 11a is closed, processing shifts to step S26 of FIG. 3, and the processing of step S26 and subsequent steps (processing such as state change message data compilation of CB closure due to re-closure action) are executed.

In contrast, if the CB 11a is not closed, by the processing of the correlation circuit 30B, a state change message expressing CB non-operation (failure of re-closure) is compiled and transferred to the correlation result transmission circuit 31B (see step S53).

Thereafter, by the processing of the CPU 31a of the correlation result transmission circuit 31B identical to that of the first embodiment, the transferred state change message Ms expressing "erroneous non-operation of the CB 11a, failure of re-closure" is used to compile state change message data MDs expressing "erroneous non-operation of the CB 11a, failure of re-closure", which is then transmitted to the power system monitoring and control host 4 through the transmission system 3.

A display screen expressing the content of the state change message is then displayed on a display by processing of the correlation result transmission unit 35, the state change message file storage unit 36 and the CB operation display unit 37 identical to that in the first embodiment.

That is, with this construction, even if a closure instruction is output to the CB 11a through the CB control circuit 22 in response to a re-closure execution signal output from the re-closure circuit 23, if this CB 11a does not close within a fixed time (T3) due to for example a defect or fault, "CB erroneous non-operation/failure of re-closure" can be displayed as the correlation result.

Consequently, since the operator can v, i.e.,w on the display screen information expressing the fact that the re-closure control has failed, the CB not having been operated, in addition to the benefits of the first embodiment, operation processing corresponding to "CB erroneous non-operation/failure of re-closure" can be rapidly performed.

A power system protection and control system according to a fourth embodiment of this invention is described below with reference to FIG. 9.

In the case of the power system monitoring and control system 1C of this embodiment, while the processing of a CPU 30a of a correlation circuit 30 of protection and control terminals 2-1–2-n in FIG. 2 and the processing of a CPU 31a of a correlation result transmission circuit 31 are different from that of the power system monitoring control system 1 described in the first embodiment.

The construction and operation of power system monitoring control system 1 shown in FIG. 2 is otherwise equivalent thereto, in this embodiment, only the processing of the CPU 30a of the correlation circuit 30C and the processing of the CPU 31a of the correlation result transmission circuit 31C will be described, the rest of the description being omitted.

The CPU 30a of the correlation circuit 30C of this embodiment performs operation processing in accordance with the algorithm (flow chart) illustrated in FIG. 9, using the open/closed state of the CBs 11a, 11b, the operation state of the relay elements 21a1–21a3 of the protective relay circuit 21 and the operation state of the re-closure circuit 23, which are transmitted thereto.

In the algorithm (flow chart) shown in FIG. 9, processing steps which are identical with the processing steps in previous FIG. 3 are given the same reference symbols and description thereof is abbreviated or omitted.

Specifically, the CPU 30a of the correlation circuit 30C checks whether a state change has occurred in the CB 11a and the mode of this state change if a state change has occurred {(tripping (closed→open)/closure (open→closed)} (FIG. 9, step S21).

If, as a result of the checking of this step S21, a CB state change (tripping: closed→open) is found, by executing processing of one or other of steps S22, 23 or steps S22, 24, an associated state change message Mt of CB fault tripping or an associated state change message Mu expressing CB tripping due to manually operated state change is compiled, and processing then shifts to the processing of step S28, to be described.

On the other hand, if the result of the checking of step S21 is that there is a CB state change (closure: open→closed), the CPU 30a determines whether or not the re-closure circuit 23 is executing re-closure (step S25).

If, as a result of the checking performed in step S25, it is found that the re-closure circuit 23 is not executing re-closure (it is reset), the CPU 30a compiles an associated state change message Mv expressing CB closure produced by manual state change (step S27), and shifts to the processing of step S28, to be described later.

Then, if, as a result of the checking performed in step S25, it is found that the re-closure circuit 23 is executing re-closure, the CPU 30a waits for a maximum of time T4 (step S60).

The CPU 30a judges whether or not the CB 11a has again performed tripping on a fault once more being detected on operation of relay elements 21a1 and 21a2 of the protective relay circuit 21 during this waiting time T4, and whether or not the open/closed state of the CB 11a transmitted from the CB state receiving circuit 24 has changed: "closure state (closed)→tripped state (open)" (step S61).

This T4 is a waiting time corresponding to the time from operation of relay elements 21a1 and 21a2 until the CB 11a has been completely tripped.

If the result of the checking of step S61 is NO, i.e., if it is found that re-tripping of the CB {CB state change (closed→open)} has not occurred, the CB 30a compiles a state change message Mw expressing re-closure success.

The CB 30a transfers this state change message Mw that has thus been compiled to correlation result transmission circuit 31C (step S62), and shifts to the processing of step S28.

On the other hand, if the result of the checking performed in step S61 is YES, i.e., re-tripping of the CB {CB state change (closed→open)} has occurred, the CPU 30a compiles a state change message Mx expressing "failure of re-closure/CB tripping state change".

The CPU 30a transfers this state change message Mx that has thus been compiled to correlation result transmission circuit 31C (step S63), and shifts to the processing of step S28.

After this, CPU 30a appends the CB operation time-point to the associated state change message that has been compiled by processing of one or another of step S23, step S24, step S27, step S62 and step S63, and transfers this to the correlation result transmission circuit 31C step S28), thereupon terminating processing.

Next, the overall operation of power system monitoring control system 1C of this embodiment in particular on re-closure failure (re-tripping of the CB) due to a continuing system fault will be described.

The Re-closure circuit 23 sends a re-closure execution signal to the CB control circuit 22 and the correlation circuit 30C in response to state change of the CB 11a (closed→open) produced by the relay operation signals and occurrence of a system fault.

The operation processing of the protective relay circuit 21, the CB control circuit 22 and the CB state receiving circuit 24 up to the point where the closure instruction is output to the CB 11a from the CB control circuit 22 in response to this re-closure execution signal is identical with that of the first embodiment, so the description thereof is omitted.

When the CB 11a is closed (open→closed) by a closure instruction output to the CB 11a, the operation state of CBs 11a, 11b, including the operation state change (open→closed) produced by re-closure of this CB 11a is transmitted by the CB state receiving circuit 24 to the correlation circuit 30C and the re-closure circuit 23.

When the correlation circuit 30C receives the re-closure execution signal sent from the re-closure circuit 23 and respectively receives the operation state change (open→closed) of the CB 11a sent from the CB state receiving circuit 24, it checks that the CB 11a was closed during the re-closure execution, and suspends processing for a maximum time T4 (see FIG. 9 step S25 and step S60).

If at this point a fault is again detected by operation of relay elements 21a1 and 21a2 of protective relay circuit 21 caused for example by the fact that there is a continuing system fault, a relay operation signal based on the operation of relay elements 21a1 and 21a2 is transmitted to the CB control circuit 22, causing a tripping instruction to be output to the CB 11a from the CB control circuit 22.

On re-tripping, in response to this tripping instruction, of the CB 11a that had previously been closed, the CB state change "closure state (closed)→tripping state (open)" is transmitted to the correlation circuit 30C through the CB state receiving circuit 24.

The correlation circuit 30C checks that CB re-tripping has occurred on receiving CB state change "(closed)→(open)" within the aforesaid time T4 (see step S62), and compiles a state change message Mx expressing "failure of re-closure/CB tripping state change" (see step S63).

It appends the CB re-tripping time-point to this compiled state change message Mx and transmits it to the correlation result transmission circuit 31C (see step S28).

Subsequently, by processing of the correlation result transmission circuit 31C identical with that of the first embodiment, state change message data MDx expressing "failure of re-closure/CB tripping state change" is compiled from state change message Mx expressing "failure of re-closure/CB tripping state change" that was transferred thereto, and is transmitted to the power system monitoring and control host 4 through the transmission system 3.

Then, by processing of the correlation result reception unit 35, the state change message file storage unit 36 and the CB operation display unit 37 identical with that of the first embodiment, a display screen displaying the contents of state change message Mx is displayed on a display.

As a result, even if, for some reason such as a continuing system fault within fixed time T4 after the output of the re-closure instruction to the CB 11a, re-closure processing has failed, "re-closure failure/CB tripping state change" can be displayed as the correlation result.

Consequently, since the operator can see on the display screen information expressing the fact that the CB was re-tripped during execution of re-closure, in addition to the benefits of the first embodiment, the operator can rapidly implement operation processing corresponding to "failure of re-closure/CB tripping state change".

In contrast, if the system fault is eliminated during suspension of processing by the correlation circuit 30C (time T4), relay elements 21a1–21a3of the protective relay circuit 21 are not operated, and the CB 11a is therefore not re-tripped even though the correlation circuit 30C waits for time T4.

The correlation circuit 30C therefore compiles (see step S62) a state change message Mw indicating "re-closure success/CB closure". The state change message which is thus compiled is transmitted (see step S28) to the correlation result transmission circuit 31C with the CB closure time-point appended thereto.

Thereafter the processing of the correlation result transmission circuit 31C is identical with that of the first embodiment, state change message data MDw is compiled expressing "success of re-closure/CB closed", based on the state change message expressing "success of re-closure/CB closed" that has thus been transferred, and this is transmitted to the power system monitoring and control host 4 through transmission system 3.

Then, the processing of the correlation result reception unit 35, the state change message file storage unit 36 and the CB operation display unit 37 are identical with that of the first embodiment, a display screen indicating the content of the state change message is displayed on a display.

As a result, if closure is effected and re-tripped does not take place within a fixed time T4 after the output of the re-closure instruction to the CB 11a, i.e., if re-closure processing is successful, the correlation result "re-closure successful/CB closed" can be displayed.

The operator is therefore able to ascertain accurately and rapidly by way of the display screen information expressing the fact that the CB has been closed during execution of re-closure.

Although in the embodiments described above, the circuit blocks constituting protection and control terminals 2-1–2-n (protective relay circuits, CB control circuit, re-closure circuit, CB state receiving circuit, correlation circuit, and correlation result transmission circuit) and circuit blocks constituting the power system monitoring and control host 4 (correlation result reception unit, associated state change message file storage unit, CB operation display unit) are respectively implemented by computers provided with a CPU and memory etc., the invention is not restricted to this.

These could be implemented by using hard wired logic circuits.

Also, the circuit blocks constituting protection and control terminals 2-1–2-n and the circuit block constituting the power system monitoring and control host 4 could be respectively implemented by a large computer comprising a single CPU and memory etc.

Figure 10:
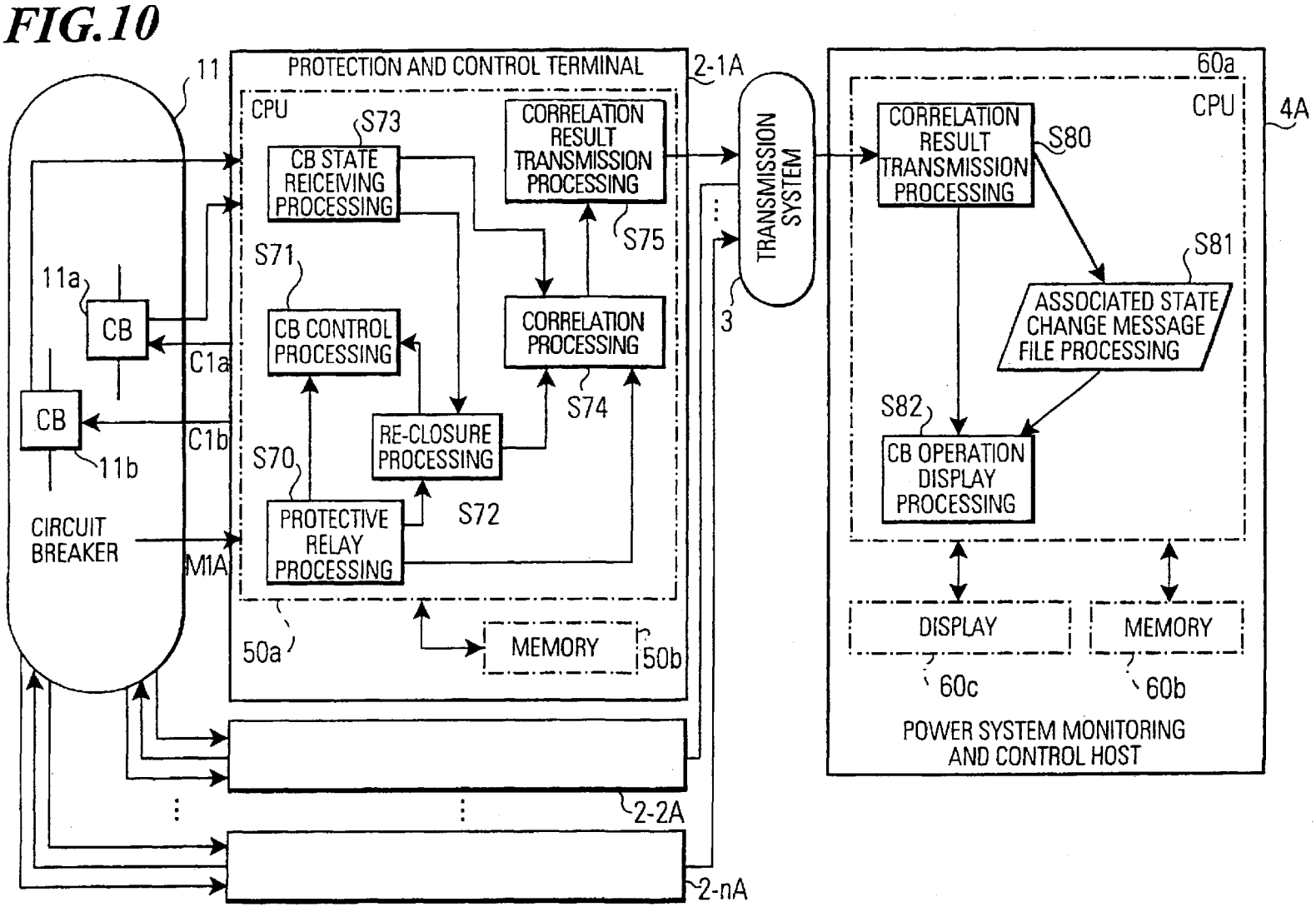
FIG. 10 shows the hardware layout and processing software of a protection and control terminal and power system monitoring and control host in the power system monitoring and control system in FIG. 1.
Figure 11:
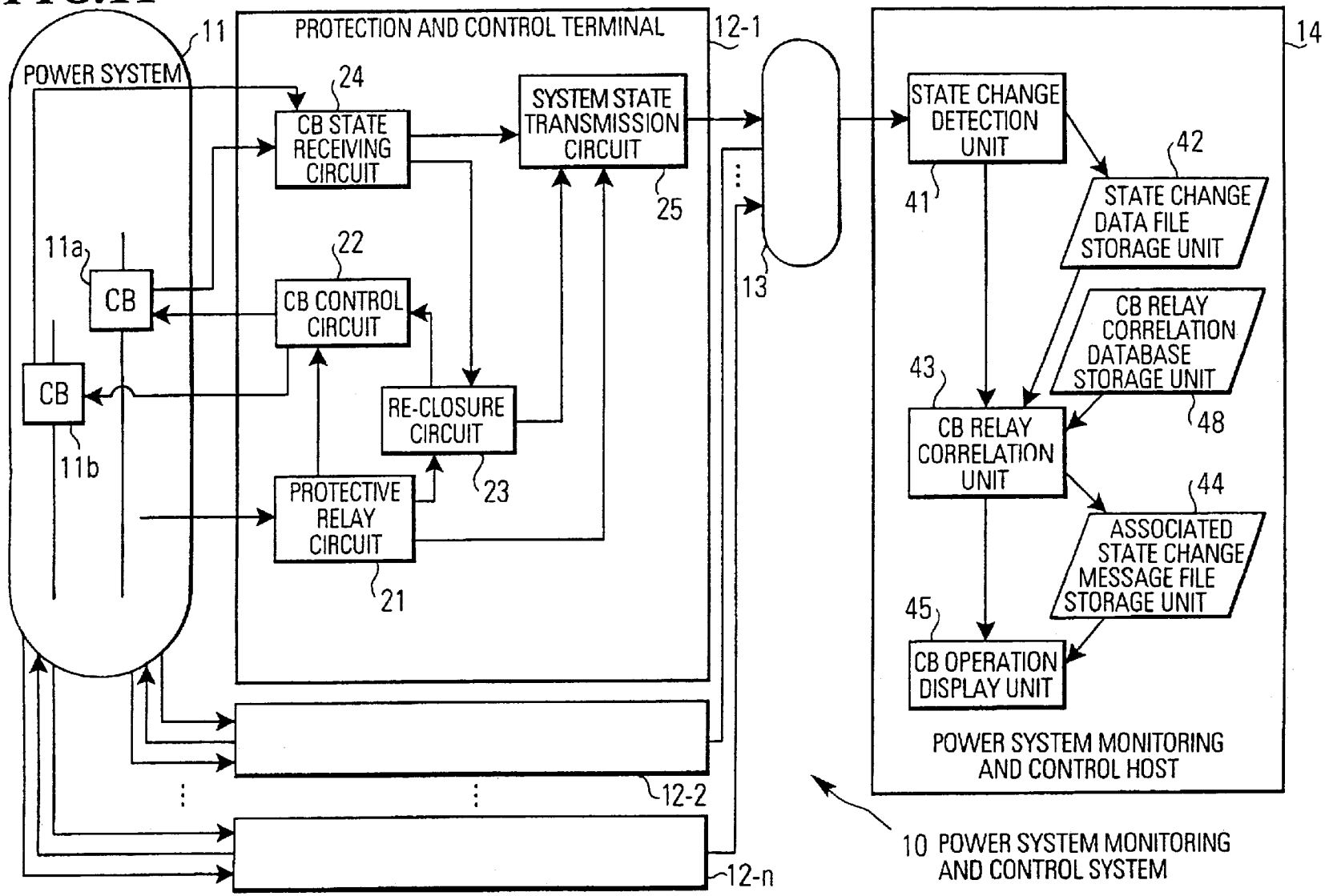
FIG. 11 shows an example of a circuit block diagram of a prior art system monitoring and control system.

FIG. 10 shows the hardware layout and processing software layout of a protection and control terminal 2-1A and power system monitoring and control host 4A respectively implemented by a single computer.

As shown in FIG. 10, a protection and control terminal 2-1A comprises a CPU 50a and a memory 50b for storing programs and data etc., to be described, necessary for the processing of this CPU 50a.

A power system monitoring and control host 4A comprises a CPU 60a and a display 60c for displaying the result of the processing of CPU 60a and a memory 60b for storing programs and data etc. necessary for the processing, to be described, of this CPU 60a.

As shown in FIG. 10, a CPU 50a of protection and control terminal 2-1A has many steps.

Aprotective relay processing S70 detects a system fault of a power system 11 by operation of a plurality of relay elements (relay unit software: main protective ground fault, main protective short circuit relay and backup short circuit relay) in accordance with state variables M1A input from power system 11.

The CB control process S71 outputs tripping/closure instructions C1a, C1b to a CB 11a, CB 11b in response to this protective relay processing S70.

The re-closure processing S72 performs the re-closure processing of the CB 11a by executing CB control processing S71 as required in accordance of protective relay processing S70.

A CB state receiving processing S73 obtains the open/closed state of the CB 11a is periodically.

Also, the CPU 50a of the protection and control terminal 20-1A has many steps.

A correlation processing S74 in which correlation of CBs 11a, 11b and relay elements 21a1–21a3 is performed by executing algorithms shown in previous FIG. 3, FIG. 7, FIG. 8 and FIG. 9, using data displaying the processing state of each relay unit software of protective relay process S70, data displaying the processing state of re-closure process S72, and data displaying the open/closed state of the CBs 11a, 11b obtained by CB state receiving process S73.

A correlation result transmission process S75 converts the associated state change message (state change message) compiled as a result of the correlation processing in correlation processing S74 by executing the algorithm shown in previous FIG. 4 is converted to state change message data in accordance with a prescribed transmission format.

Then the state change message data which has thus been converted is transmitted to a transmission monitoring device 4A through the transmission system 3.

As shown in FIG. 10, a CPU 60a of a power system monitoring and control host 40A has many steps.

A correlation result reception processing S80 receives the state change message data constituting the result of correlation transmitted through the transmission system 3 from protection and control terminals 2-1–2-n.

The correlation result reception S80 extracts the correlation result (state change message) contained in the state change message data in accordance with the transmission format F.

An associated state change message file storage processing S81 preserves the correlation result (state change message) obtained by this correlation result reception processing S80 in a memory 60b as a file format.

A CB operator display processing S82 reads and displays the state change message file stored in the memory 60b by a screen of a display 60c.

In this way, operation practically equivalent to the operation of protection and control terminals 2-1–2-n and the power system monitoring and control host 4 shown in previous FIG. 2 can be executed and practically equivalent results obtained, even through protection and control terminals 2-1A–2-nA and the power system monitoring and control host 4A are respectively implemented by a single computer.

Also, although, in the embodiments above, the associated state change message was constituted including the various data items shown in FIG. 6, the invention is not restricted to this structure.

That is to say, the fault-related information, CB last tripping information, or high speed/intermediate speed re-closure classification information etc. could also be included.

Furthermore, when CB operation or relay operation that is unnecessary for employment of the power system is provoked for purposes of periodic inspection or maintenance etc. of the power system equipment or protection and control terminals, it is possible to effect setting such that the state change message of the CB in question is not displayed on the display of the power system monitoring and control host.

Specifically, the correlation result transmission unit of the power system monitoring and control host is provided with a data file in which, at such a Cs (Cs whose display is to be hidden) there is set for example a state "executing inspection".

If then the correlation result transmission unit receives the state change message data of a CB, the arrangement is such that it refers to this data file and correlates the CB of the state change message data in question with the CB whose display is to be hidden, for which the state "executing inspection" is set in the data file and, if the CB of the state change message data is found to be set as the CB whose display is to be hidden, deletes (discards) the CB state change message data which it has thus received.

With such a construction, it is possible to effect setting such that only the state change messages of CBs that are not required for operation of the power system are set to "not displayed".

Therefore, the monitoring operation of the power system can be performed efficiently.

Furthermore, although, in the embodiments described above, processing is executed whereby the associated state change message is transferred to the correlation result transmission circuit in the form of a associated state change message with the time-point of CB operation appended thereto, by adding the time-point of CB operation, this CB operation time-point could be the ordinary time of CB operation or could be a highly accurate time of accuracy for example 100 ns obtained using a GPS system.

Furthermore, although, in the embodiments described above, although a case was described where the power system monitoring control system was constituted by connecting a plurality of protection and control terminals to the power system monitoring and control host through a transmission system (communication network), the invention is not restricted to this structure, and a single protection and control terminal could be employed.

It is also possible to employ the protection and control terminals independently, isolated from the communication network. If the protection and control terminals are employed independently in this way, the state change messages captured at each protection and control terminal can either for example be displayed by for example a display at each protection and control terminal, or can be stored in memory.

Although, in the embodiments described above, the open/closed state of CB 11a was obtained periodically by digital processing performed by CB state receiving circuit 24 (or CB state receiving processing of protection and control terminal 2-1A), the invention is not restricted to this and may include analogue processing.

That is to say, processing in which the open/closed state is continuously obtained could be employed.

Since, as described above, with a power system protected control device, power system monitoring control system and storage medium storing a program according to the invention, the correlation processing of relay operation or re-closure control execution and switch state change produced by such relay operation or re-closure execution is performed at at least one protection and control terminal without going through the transmission system, even if there are a plurality of protection and control terminals, the number of switches within the protection and control terminals and the number of relay elements corresponding to these switches can be restricted to only a few.

Consequently, correlated with the conventional case in which correlation processing was effected of the CB state change data with all of the state change data in a plurality of protection and control terminals, the correlation processing can be carried out extremely accurately, easily and rapidly.

Likewise, since, with a power system protection and control terminal, power system monitoring control system and storage medium storing a program according to the invention, the above correlation processing is performed at at least one protection and control terminal without going through the transmission system, the order of relay operation/re-closure control and switch state change produced by this relay operation/re-closure control is always maintained and it is unnecessary to take into account time discrepancy between the time-point of relay operation detection (time-point of re-closure control detection) and the time-point of switch state change detection.

Consequently, the CB relay correlation database that is conventionally necessary to enable correlation processing to be performed without being effected by inversion of operation order or the presence of time discrepancies becomes unnecessary and the task of maintenance of such a CB relay correlation database also becomes unnecessary, resulting in very considerable labor saving.

In particular, with the power system monitoring and control system of this invention, since the processing for adding to the correlation result of the operation time-point of the operated switch is performed by at least one protection and control terminal that detected operation of this switch, an extremely accurate switch operation time-point can be obtained with no transmission delay etc.

Also, since a message consisting of a large number of items of information including information expressing the operation time-point of switches can be acquired as correlation result by at least one protection and control terminal, it is also possible for the at least one protection and control terminal to display or store for example this correlation result; in this way, the information utilization function of the power system protection and control terminal itself can be raised.

The entire contents of JAPANESE PRIORITY APPLICATION NUMBER P10-108255, filed on Apr. 17, 1998, are hereby incorporated by reference.

The present invention is by no intent limited to the embodiments described heretofore, but various variation and modification may be made without departing from the present invention.

What is claimed is:

1. An electric power system protection and control system, comprising:

a plurality of protection [controllers] *and control terminals*, each for executing protection and control of an electric power system by inputting a status quantity; and a power system monitoring and control host connected to each of said protection [controllers] *and control terminals* via a communication network, for monitoring and controlling an operation of said power system based on information sent from said protection and control terminals;

each of said protection [controllers] *and control terminals* comprising:

a correlation processing unit having a CPU and a memory unit, which are connected within the protection and controller, the correlation processing unit correlating the operation state changes of two-way switch operations and protective relay operations, facilitating accurate time-point stamping of state change data and eliminating any order switching between relay and CB operation state changes; and sending means for sending result of said [correlating means] *correlation processing unit* to said [protection and control terminals] *power system monitoring and control host* via said communication network, respectively; and said power system monitoring and control host comprising:

receiving/displaying means for receiving said result of said [comparing means] *correlation processing unit* via said communication network and displaying said result of said [comparing means] *correlation processing unit*.

2. The electric power system protection and control system according to claim 1, further comprising:

relay means for tripping said two-way switch in accordance with said status quantity of said power system, wherein said [correlating means] *correlation processing unit* is provided with, first judging means for judging whether said two-way switch is opened or closed in accordance with said operation state of said two-way switch;

second judging means for judging whether a relay is operated in association with said two-way switch is opened when said first judging means judges said two-way switch is opened;

first forming means for forming data as said result of said [correlating means] *correlation processing unit* based on both data of said relay and said two-way switch after said second judging means; and second forming means for forming data as a correlation result, which said two-way switch is opened by a manual operation, when no operation in said two-way switch is judged by said second judging means.

3. The electric power system protection and control system according to claim 2, further comprising:

re-closing means for re-closing said two-way switch;

wherein said [correlating means] *correlation processing unit* is provided with, third judging means for judging whether said re-closing means is operated in accordance with said two-way switch when said two-way switch is judged by said first judging means as not being closed;

third forming means for forming data as a correlation result, in which said two-way switch is operated, when said two-way switch is judged by said third judging means as being closed; and fourth forming means for forming data as a correlation result, in which said two-way switch is re-closed by said manual operation, when said third judging means judge that said two-way switch is closed, but said re-closing means is not executed.

4. The electric power system protection and control system according to claim 2, wherein said [correlating means] *correlation processing unit* is provided with, fourth judging means for judging whether said relay is operated;

fifth judging means for judging whether said two-way switch is re-closed within a fixed time corresponding to said relay being operated when said relay is judged as operated by said fourth judging means; and fifth forming means for forming data as correlation result, in which said two-way switch is failed to trip, when said two-way switch is judged as not re-closed within the fixed time by said fifth judging means.

5. The electric power system protection and control system according to claim 3, wherein said [correlating means] *correlation processing unit* is provided with, sixth judging means for judging whether said re-closing means is executed;

seventh judging means for judging whether said two-way switch is re-closed within a fixed time when said sixth judging means judge said re-closing means is executed; and sixth forming means for forming data as a correlation result, in which said two-way switch is failed to be re-closed, when said seventh judging means judge that said re-closing means is executed within a fixed time, but said two-switch is not closed.

6. The electric power system protection and control system according to claim 3, wherein said [correlating means] *correlation processing unit* is provided with, eighth judging means for judging whether said two-way switch is re-tripped when said third judging means judge that said two-way switch is closed and said re-closing means is executed; and seventh forming means for forming data as a correlation result, in which said two-way switch is failed to be re-closed, when said re-closing means if re-tripped within fixed time as judged by said eighth judging means.

7. The electric power system protection and control system according to claim 6, wherein said [correlating means] *correlation processing unit* is provided with, eighth forming means for forming data as a correlation result, in which means said two-way switch is re-closed, when said two-way switch is not re-tripped within the fixed time as judged by said eighth judging means.

8. The electric power system protection and control system according to claim 1, wherein said sending means is provided with, converting means for converting data sent by said [correlating means] *correlation processing unit* into converted data based on a predetermined format;

sending means for sending said converted data to said receiving/displaying means via a communication network, wherein said receiving/displaying means is provided with, first receiving means for receiving said converted data from sending means; and displaying means for displaying said correlation result based on said converted data.

9. The electric power system protection and control system according to claim 1, wherein said [correlating means] *correlation processing unit* makes at least one of operation time, two-way switch name, direction of operation, and operational area, related to said two-way switch name, as the correlation result.

[10. A program storing medium readable by a computer, the medium storing a program of instructions executable by said computer to perform method steps for an electric power system protection and control system, comprising:

a plurality of protection and control terminals, each for executing protection and control of an electric power system by inputting a status quantity; and a power system monitoring and control host connected to each of said protection and control terminals via a communication network, for monitoring and controlling an operation of said power system based on information sent from said protection and control terminals;

said method comprising the steps of:

correlating in the protection and control terminals operation state changes of two-way switch operations and protective relay operations, facilitating accurate time-point stamping of state chance data and eliminating any order switching between relay and CB operation state changes; and sending a result of said correlating steps to said power system monitoring and control host via said communication network, respectively.]

[11. The program storing medium according to claim 10, wherein:

executing correlating means steps comprising:

executing first judging means step for executing said first judging means for judging whether said two-way switch is opened or closed in accordance with a operation of said two-way switch;

executing second judging means step for executing said second judging means for judging whether relay is operated in association with said two-way switch is opened when said first judging means judge that said two-way switch is opened;

executing first forming means step for executing said first forming means for forming data as said result of said correlating means based on both data of said relay and said two-way switch after said second judging means; and executing second forming means step for executing said second forming means forming data as a correlation result, which said two-way switch is opened by manual operation, when no operation in said two-way switch is judged by said second judging means.]

12. An electric power system protection and control system, comprising:

a plurality of protection and control terminals, each for executing protection and control of an electric power system by inputting a status quantity;

a power system monitoring and control host connected to each of said protection and control terminals via a communication network, for monitoring and controlling an operation of said power system based on information sent from said protection and control terminals comprising:

each of said protection [controllers] *and control terminals* comprising:

a correlation processing unit having a CPU and a memory unit, which are connected within the protection controller, the correlation processing unit correlating the operation state changes of two-way switch operations and protective relay operations, facilitating accurate time-point stamping of state change data and eliminating any order switching between relay and CB operation state changes; and a correlation result transmission circuit to send a result of said correlation [circuit] *processing unit* to said [protection and control terminals] *power system monitoring and control host* via said communication network, respectively;

said power system monitoring and control host comprising:

correlation result reception unit to receive said result of said correlation processing unit; and a CB operation display unit to display said result of said correlation received by said correlation result reception unit.

13. The electric power system protection and control system according to claim 12, further comprising:

a protective relay circuit to trip said two-way switch in accordance with said status quantity of said power system;

wherein said correlation [circuit] *processing unit* is provided with a CPU, said CPU comprising: a first judging unit judge whether said two-way switch is opened or closed in accordance with said operation state of said two-way switch;

a second judging unit to judge whether a relay is operated in association with said two-way switch is opened when said first unit judges said two-way switch is opened;

a first forming unit to form data as said result of said correlation result transmission circuit based on both data of said relay and said two-way switch after said second judging unit; and a second forming unit to form data as a correlation result, which said two-way switch is opened by a manual operation, when no operation in said two-way switch is judged by said second judging unit.

14. The electric power system protection and control system according to claim 13, further comprising:

a re-closure circuit to re-close said two-way switch, wherein said correlation result transmission circuit is provided with a CPU, said CPU comprising: a third judging unit to judge whether said re-closure circuit is operated in accordance with said two-way switch when said two-way switch is judged by said first judging unit as not being closed;

a third forming unit to form data as a correlation result, in which said two-way switch is operated, when said two-way switch is judged by said third judging unit as being closed; and a fourth forming unit to form data as a correlation result in which said two-way switch is re-closed by said manual operation, when said third judging unit judge that said two-way switch is closed, but said re-closure circuit is not executed.

15. The electric power system protection and control system according to claim 13, wherein said correlation result transmission circuit is provided with a CPU, said CPU comprising:

a fourth judging unit to judge whether said relay is operated;

a fifth judging unit to judge whether said two-way switch is re-closed within a fixed time corresponding to said relay being operated when said relay is judged as operated by said fourth judging unit; and a fifth forming unit to form data as correlation result, in which said two-way switch is failed to trip, when said two-way switch is judged as not re-closed within the fixed time by said fifth judging unit.

16. The electric power system protection and control system according to claim 14, wherein said correlation result transmission circuit is provided with a CPU, said CPU comprising:

a sixth judging unit to judge whether said re-closure circuit is executed;

a seventh judging unit to judge whether said two-way switch is re-closed within a fixed time when said sixth judging unit judge said re-closure circuit is executed; and a sixth forming unit to form data as a correlation result, in which said two-way switch is failed to be re-closed, when said seventh judging unit judge that said re-closure circuit is executed within a fixed time, but said two-switch is not closed.

17. The electric power system protection and control system according to claim 14, wherein said correlation result transmission circuit is provided with a CPU, said CPU comprising:

a eighth judging unit to judge whether said two-way switch is re-tripped when said third judging unit judge that said two-way switch is closed and said re-closure circuit is executed; and a seventh forming unit to form data as a correlation result, in which said two-way switch is failed to be re-closed, when said re-closure circuit is re-tripped within fixed time as judged by said eighth judging unit.

18. The electric power system protection and control system according to claim 17, wherein said correlation result transmission circuit is provided with, a eighth forming unit to form data as a correlation result, in which means said two-way switch is re-closed, when said two-way switch is not re-tripped within the fixed time as judged by said eighth judging unit.

19. The electric power system protection and control system according to claim 12, wherein said correlation result transmission circuit is provided with, a converting unit to convert data sent by said correlation circuit into converted data based on a predetermined format; and a sending unit to send said converted data to said correlation result reception unit via a communication network, wherein said correlation result reception unit is provided with, a first receiving unit to receive said converted data from sending unit; and a displaying unit to display said correlation result based on said converted data.

20. The electric power system protection and control system according to claim 12, wherein said correlation result transmission circuit makes at least one of operation time, two-way switch name, direction of operation, and operational area, related to said two-way switch name, as the correlation result.

* * * * *